US012445391B2

(12) United States Patent
Bernardos et al.

(10) Patent No.: US 12,445,391 B2
(45) Date of Patent: Oct. 14, 2025

(54) METHODS, APPARATUSES AND SYSTEMS DIRECTED TO WIRELESS TRANSMIT/RECEIVE UNIT BASED JOINT SELECTION AND CONFIGURATION OF MULTI-ACCESS EDGE COMPUTING HOST AND RELIABLE AND AVAILABLE WIRELESS NETWORK

(71) Applicant: InterDigital Patent Holdings, Inc., Wilmington, DE (US)

(72) Inventors: Carlos Jesus Bernardos, Alcorcon (ES); Alain Mourad, Ascot (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 336 days.

(21) Appl. No.: 18/267,026

(22) PCT Filed: Dec. 16, 2021

(86) PCT No.: PCT/US2021/063781
§ 371 (c)(1),
(2) Date: Jun. 13, 2023

(87) PCT Pub. No.: WO2022/133076
PCT Pub. Date: Jun. 23, 2022

(65) Prior Publication Data
US 2024/0064115 A1     Feb. 22, 2024

Related U.S. Application Data

(60) Provisional application No. 63/126,786, filed on Dec. 17, 2020.

(51) Int. Cl.
*H04L 47/70*     (2022.01)
*H04L 67/10*     (2022.01)
*H04L 69/24*     (2022.01)

(52) U.S. Cl.
CPC ............ *H04L 47/824* (2013.01); *H04L 67/10* (2013.01); *H04L 69/24* (2013.01)

(58) Field of Classification Search
CPC ....... H04L 47/824; H04L 67/10; H04L 69/24; H04L 41/5009; H04L 43/50; H04L 67/61;
(Continued)

(56) References Cited

U.S. PATENT DOCUMENTS

2013/0065585 A1*   3/2013   Pelletier ................. H04L 67/55
                                                        455/456.6
2014/0086177 A1*   3/2014   Adjakple .............. H04W 74/04
                                                        370/329
(Continued)

FOREIGN PATENT DOCUMENTS

EP         3300303 A1     3/2018
EP         3731495 A1     10/2020
(Continued)

OTHER PUBLICATIONS

Anonymous, "Mobile Edge Computing (MEC); Framework and Reference Architecture", European Telecommunications Standards Institute (ETSI), Document: ETSI GS MEC 003 V2.1.1, Jan. 2019, 21 pages.

(Continued)

*Primary Examiner* — Lesa M Kennedy
(74) *Attorney, Agent, or Firm* — Volpe Koenig

(57) ABSTRACT

A method implemented by a wireless transmit/receive unit includes transmitting a first request message for requesting a list of applications available to the wireless transmit/receive unit in a multi-access edge computing system and receiving a first response message indicating the list of available applications, and, for at least one application, any of a supported latency, a supported bandwidth, a supported reliability, a supported jitter and a supported path redun-
(Continued)

dancy A second request message is transited indicating any of a requested latency, a requested bandwidth, a requested reliability, a requested jitter and a requested path redundancy, based on any of the indicated supported latency, the indicated supported bandwidth, the indicated supported reliability, the indicated supported jitter and the indicated supported path redundancy. A second response message is received indicating any of a provided latency, a provided bandwidth, a provided reliability, a provided jitter and a provided path redundancy.

20 Claims, 15 Drawing Sheets

(58) Field of Classification Search
CPC . H04L 41/0896; H04L 47/724; H04L 47/803; H04L 67/51
See application file for complete search history.

(56) References Cited

U.S. PATENT DOCUMENTS

2020/0374974 A1\* 11/2020 Sun .......................... H04L 41/20
2023/0291812 A1\* 9/2023 Roth ........................ H04W 4/02

FOREIGN PATENT DOCUMENTS

WO   WO 2020068238 A1   4/2020
WO   WO 2022020561 A1   1/2022

OTHER PUBLICATIONS

Bernardos et al., "Extensions to enable wireless reliability and availability in multi-access edge deployments", Internet Engineering Task Force (IETF), Raw WG, Internet-Draft, Jul. 27, 2020, 16 pages.
Bernardos et al., "RAW use cases", Internet Engineering Task Force (IETF), RAW, Internet-Draft, Mar. 8, 2020, 21 pages.
Thubert et al., "Reliable and Available Wireless Architecture/ Framework", Internet Engineering Task Force (IETF), RAW, Internet-Draft, May 25, 2020, 28 pages.
Kekki et al., "MEC in 5G networks", European Telecommunications Standards Institute (ETSI), ETSI White Paper No. 28, First Edition, Jun. 2018, 28 pages.
Bernardos et al., "Terminal-based joint selection and configuration of MEC host and RAW network", Internet Engineering Task Force (IETF), RAW WG, Internet-Draft, Sep. 10, 2021, 14 pages.
Anonymous, "Multi-access Edge Computing (MEC); Device application interface", European Telecommunications Standards Institute (ETSI), Document: ETSI GS MEC 016 V2.2.1, Apr. 2020, 28 pages.

\* cited by examiner

METHODS, APPARATUSES AND SYSTEMS DIRECTED TO WIRELESS TRANSMIT/RECEIVE UNIT BASED JOINT SELECTION AND CONFIGURATION OF MULTI-ACCESS EDGE COMPUTING HOST AND RELIABLE AND AVAILABLE WIRELESS NETWORK

CROSS REFERENCE TO RELATED APPLICATIONS

This application is a U.S. National Stage Application under 35 U.S.C. § 371 of International Patent Application No. PCT/US2021/063781, filed Dec. 16, 2021, which claims the benefit of U.S. Application No. 63/126,786, filed Dec. 17, 2020, which is incorporated herein by reference in its entirety.

BACKGROUND

The present disclosure relates to network communications, including, but not exclusively, to methods, apparatuses, systems, etc. directed to joint selection and configuration of multi-access edge computing (MEC) and reliable and available wireless (RAW) network.

SUMMARY

In one embodiment, a method implemented by a wireless transmit/receive unit (WTRU) includes transmitting a first request message for requesting a list of applications available to the WTRU in a multi-access edge computing system, and receiving a first response message indicating the list of available applications of the list of applications, and, for at least one application, any of a supported latency, a supported bandwidth, a supported reliability, a supported jitter and a supported path redundancy. A second request message is transited indicating any of a requested latency, a requested bandwidth, a requested reliability, a requested jitter and a requested path redundancy, based on any of the indicated supported latency, the indicated supported bandwidth, the indicated supported reliability, the indicated supported jitter and the indicated supported path redundancy. A second response message is received indicating any of a provided latency, a provided bandwidth, a provided reliability, a provided jitter and a provided path redundancy.

In one embodiment, an apparatus including circuitry, including any of a transmitter, a receiver, a processor and a memory, is configured to transmit a first request message for requesting a list of applications available to the apparatus in a multi-access edge computing, MEC, system and receive a first response message indicating the list of available applications and, for at least one application of the list of applications, any of a supported latency, a supported bandwidth, a supported reliability, a supported jitter and a supported path redundancy. The apparatus is further configured to transmit a second request message indicating any of a requested latency, a requested bandwidth, a requested reliability, a requested jitter and a requested path redundancy, based on any of the indicated supported latency, the indicated supported bandwidth, the indicated supported reliability, the indicated supported jitter and the indicated supported path redundancy. The apparatus is further configured to receive a second response message indicating any of a provided latency, a provided bandwidth, a provided reliability, a provided jitter and a provided path redundancy.

Although various embodiments are described and/or claimed herein in which an apparatus, system, device, etc. and/or any element thereof is configured to carry out an operation, process, algorithm, function, etc. and/or any portion thereof, it is to be understood that any embodiments described and/or claimed herein assume that any apparatus, system, device, etc. and/or any element thereof carries out any operation, process, algorithm, function, etc. and/or any portion thereof (and vice versa).

BRIEF DESCRIPTION OF THE DRAWINGS

A more detailed understanding may be had from the following description, given by way of example in conjunction with the accompanying drawings. Figures in such drawings, like the detailed description, are examples. As such, the Figures and the detailed description are not to be considered limiting, and other equally effective examples are possible and likely. Furthermore, like reference numerals in the figures indicate like elements.

DETAILED DESCRIPTION

A detailed description of illustrative embodiments will now be described with reference to the various Figures.

Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Communications Networks

Figure 1A:
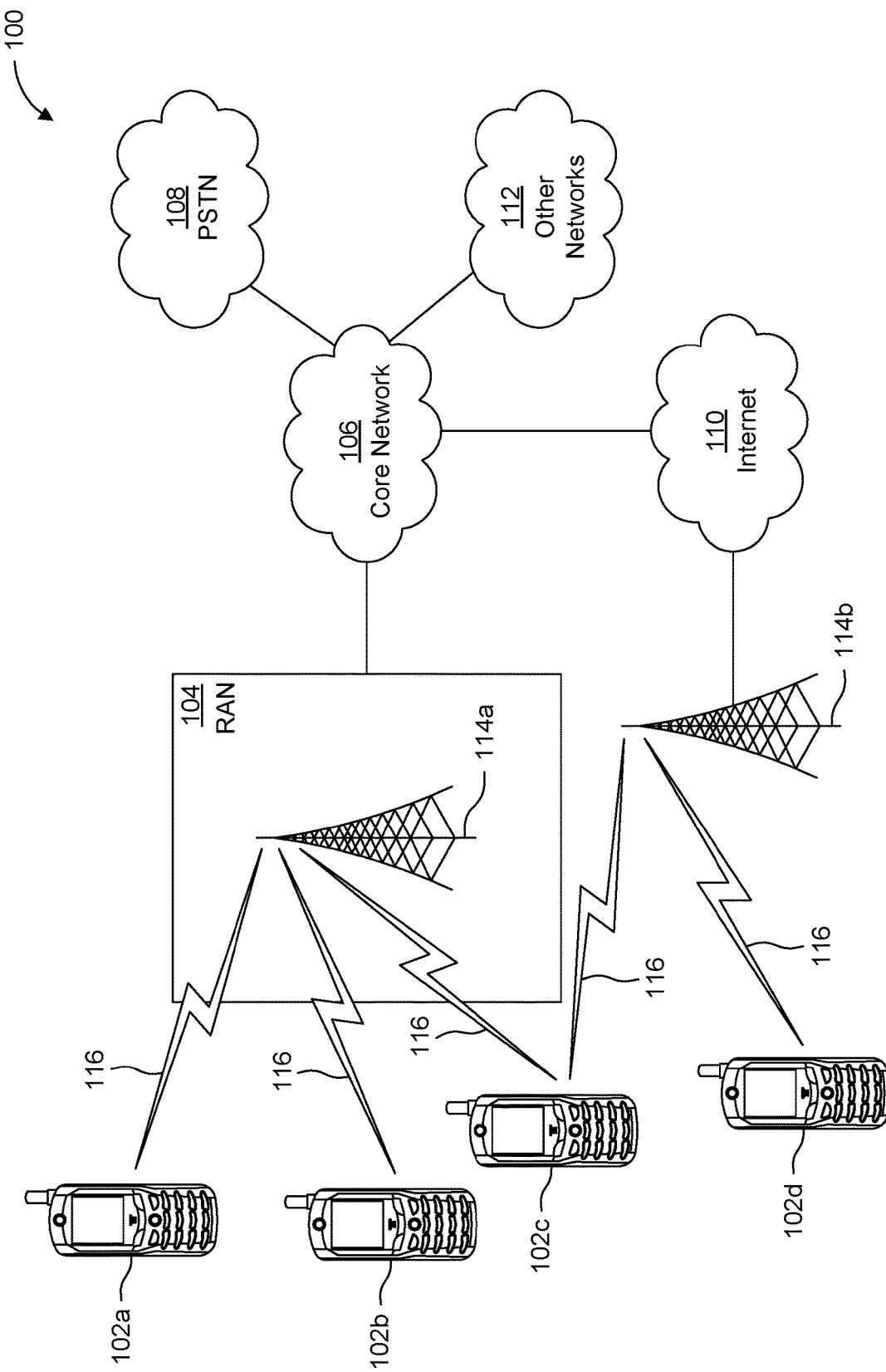
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or an "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, an NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
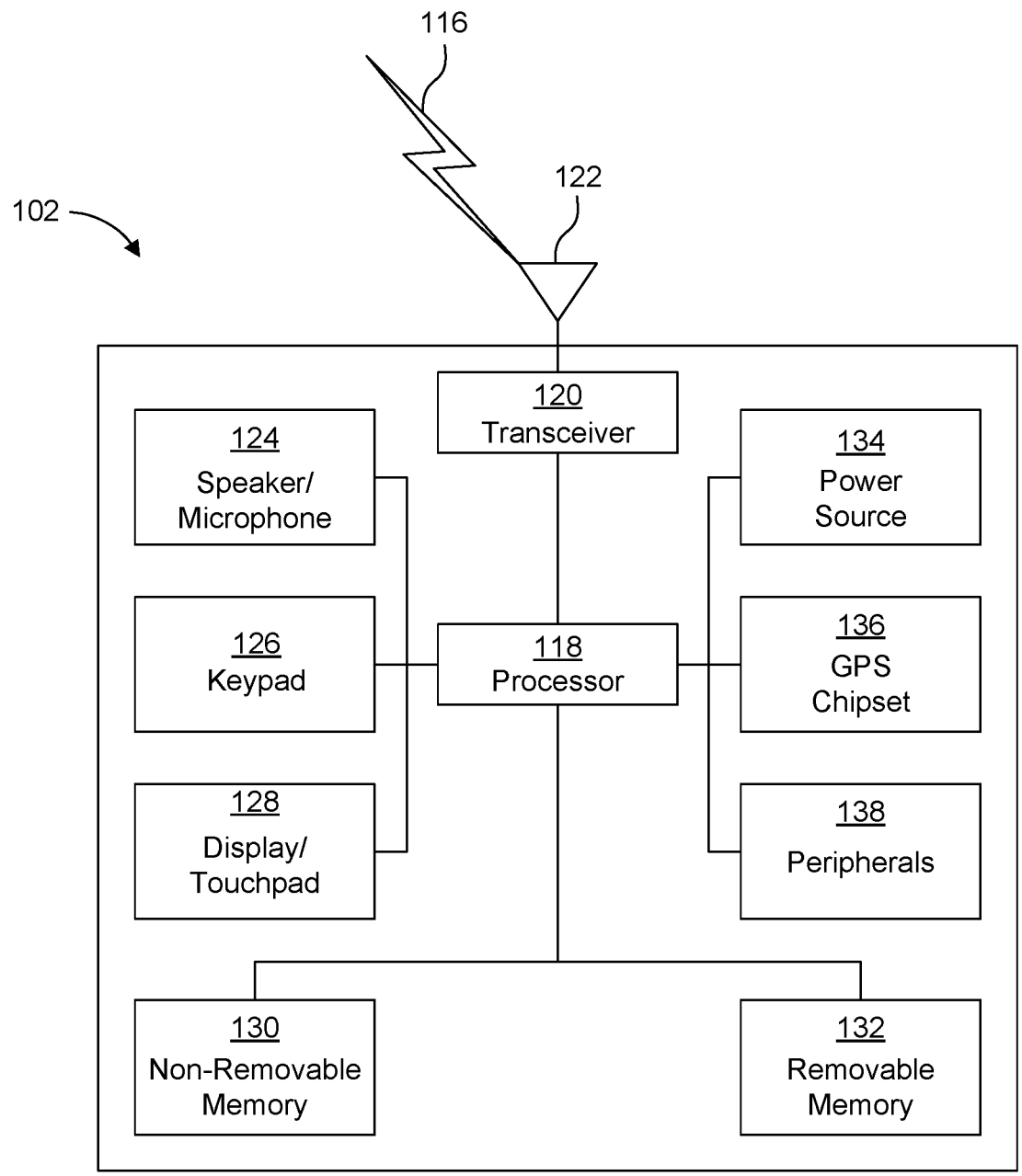
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special-purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full-duplex radio for which transmission and reception of some or all of the signals (e.g., associated with particular subframes for both the UL (e.g., for transmission) and downlink (e.g., for reception) may be concurrent and/or simultaneous. The full-duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
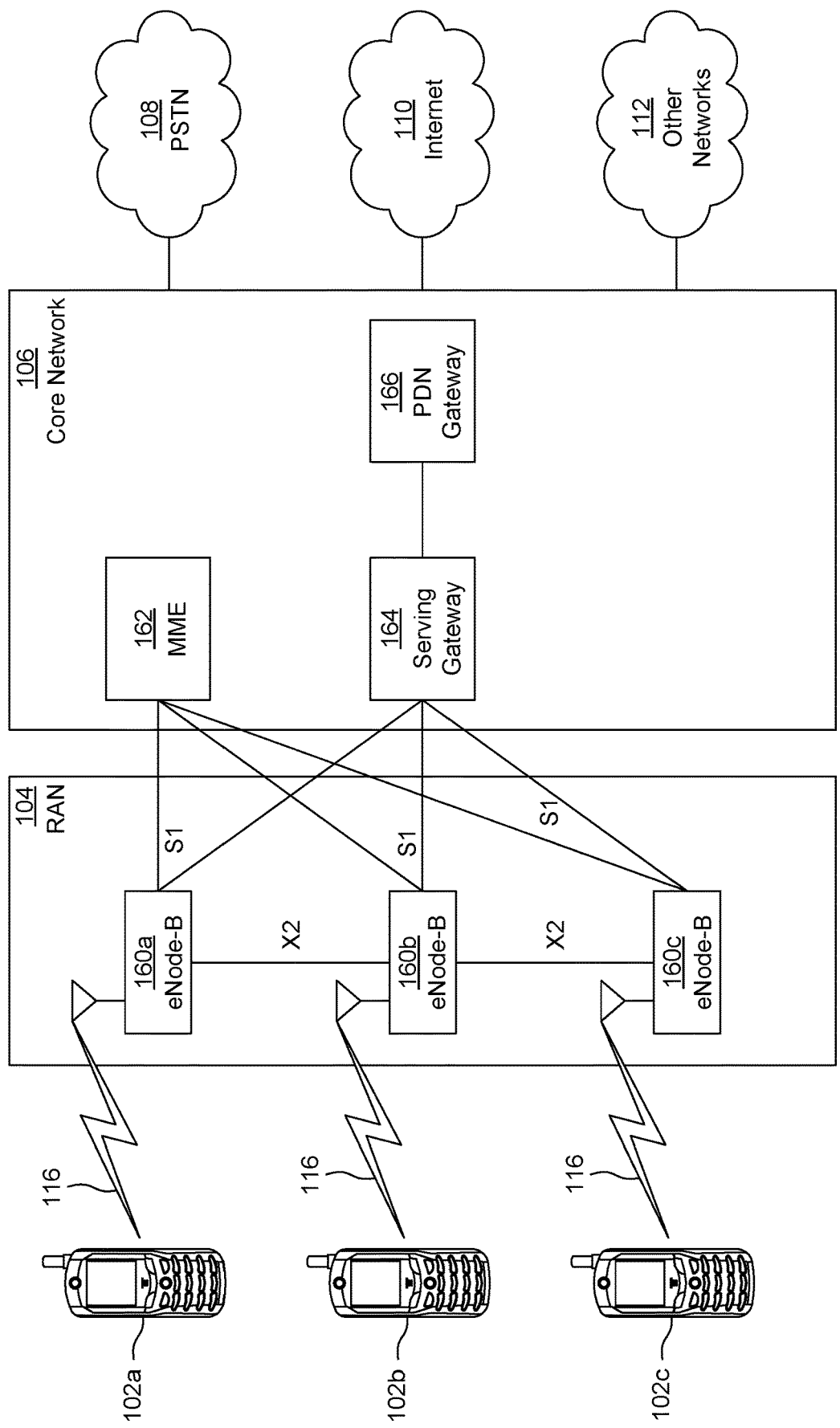
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing and time domain processing may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by an STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to an STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
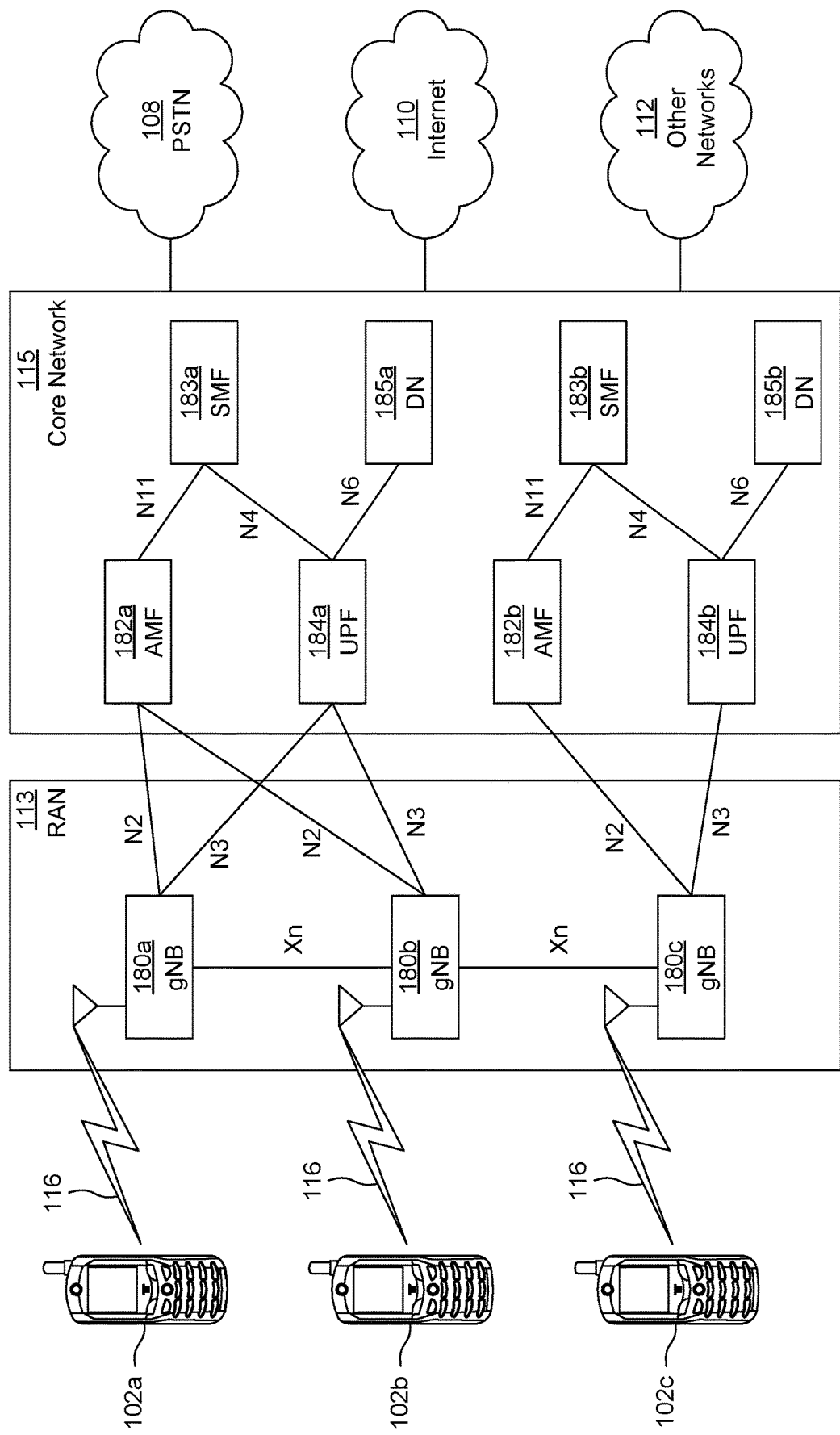
FIG. 1D is a system diagram illustrating a further example RAN and a further example of a CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized by WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented or deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented or deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Multi-Access Edge Computing Example

Multi-access edge computing (MEC) capabilities deployed in the edge of a mobile network may enable (e.g., facilitate) dynamic (e.g., and efficient) provision of services to mobile users. Multi-access edge computing may also be referred to as mobile edge computing.

Figure 2:
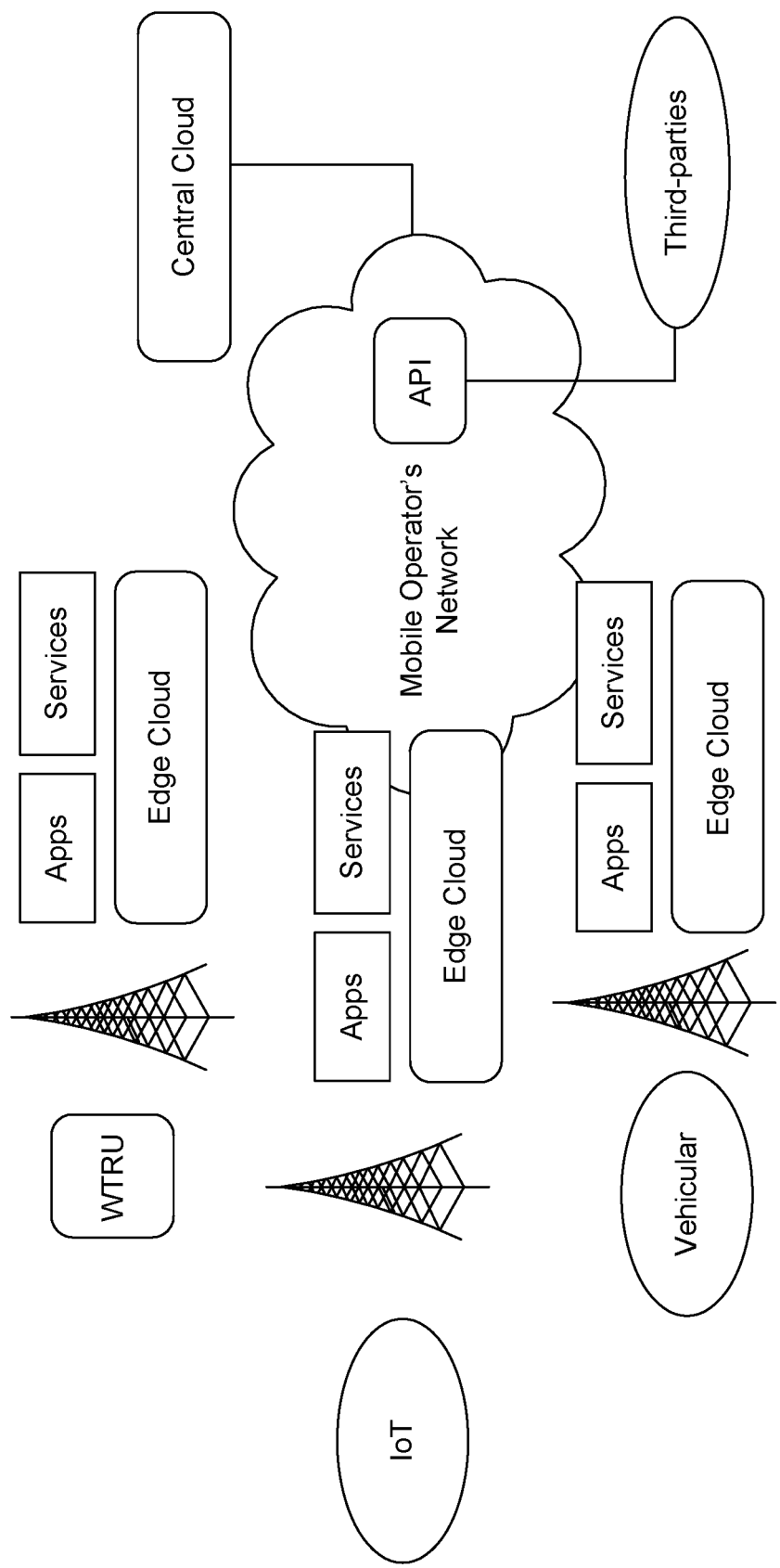
FIG. 2 is a system diagram illustrating an example of a MEC system.

FIG. 2 is a system diagram illustrating an example of a MEC system. The European Telecommunications Standards Institute (ETSI) industry specification group (ISG) MEC working group, specifies an open environment for integrating MEC capabilities with service provider networks as illustrated in FIG. 2. The open environment may include applications from third parties. For example, distributed computing capabilities may allow information technology (IT) infrastructures to be made available e.g., as in a cloud environment, for the deployment of functions in mobile access networks.

Figure 3:
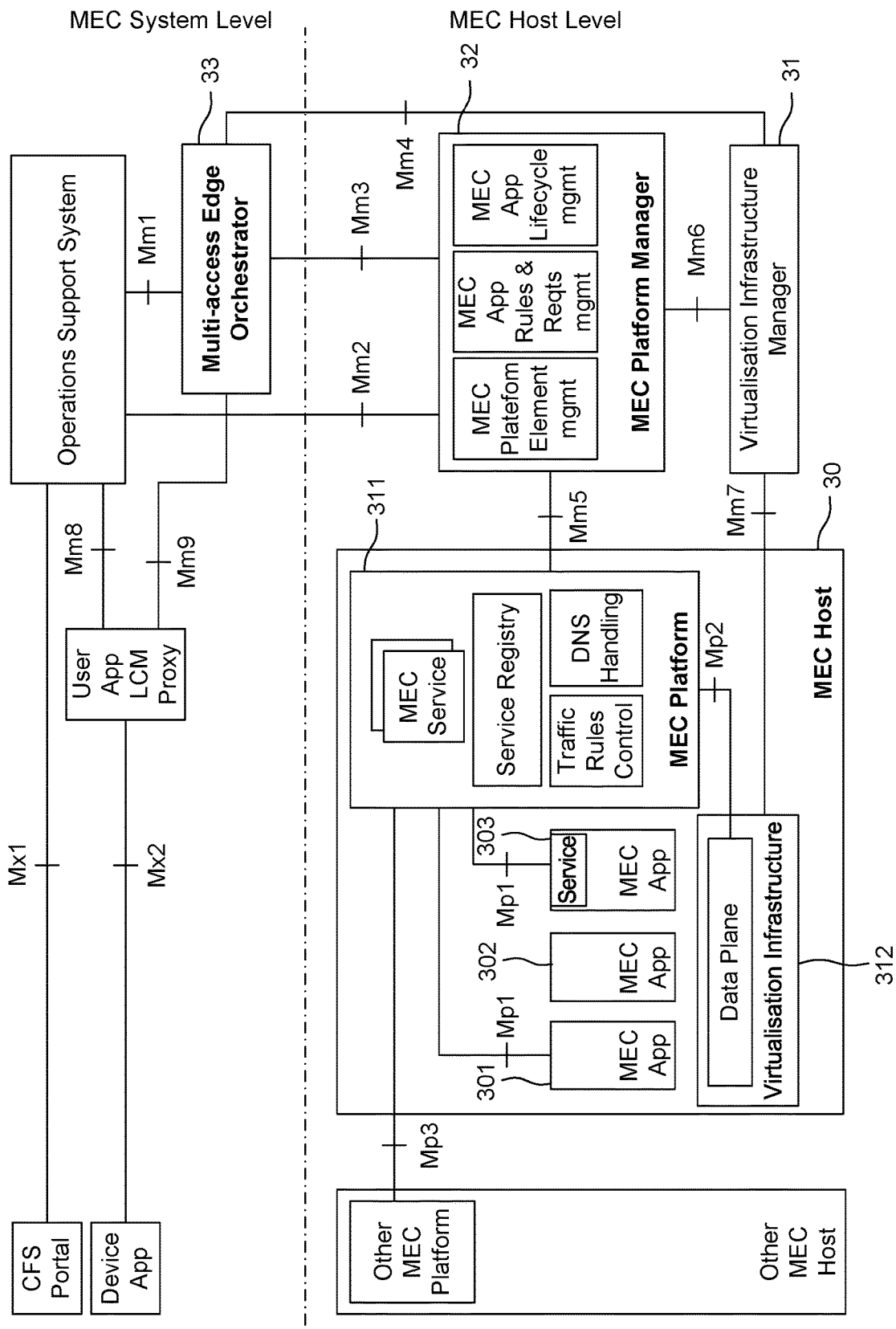
FIG. 3 is a system diagram illustrating an example of the ETSI MEC reference architecture.

FIG. 3 is a system diagram illustrating an example of the ETSI MEC reference architecture. The MEC reference architecture may include functional elements that may comprise the mobile edge systems and reference points between the functional elements. There may be three groups of reference points between system entities. For example, a first group of reference points related to the mobile edge platform functionality may be referred to herein as Mp. A second group of reference points related to management functions may be referred to herein as Mm. A third group of reference points allowing to connect to external entities may be referred to herein a Mx.

For example, the mobile edge system may comprise mobile edge hosts 30 and the mobile edge management (e.g., functions, elements) for running (e.g., executing) mobile edge applications 301, 302, 303 within (e.g., a subset of) an operator network.

A mobile edge host 30 may be seen as an entity comprising a mobile edge platform 311 and a virtualization infrastructure 312 which may provide any of compute, storage, and network resources, for (e.g., the purpose of) running mobile edge applications 301, 302, 303.

A mobile edge platform 311 may be seen as a set (e.g., collection) of functions for running (e.g., executing) mobile edge applications 301, 302, 303 on a (e.g., particular) virtualization infrastructure. The mobile edge platform 311 may enable mobile edge applications 301, 302, 303 to any of provide and consume mobile edge services.

Mobile edge applications 301, 302, 303 may be instantiated (e.g., started) on the virtualization infrastructure of the mobile edge host, for example, based on configuration requests that may be, for example, validated by the mobile edge management.

The mobile edge management (e.g., functions, elements) may comprise the mobile edge system level management (e.g., functions, elements) and the mobile edge host level management (e.g., functions, elements).

The mobile edge system level management (e.g., functions, elements) may include the mobile edge orchestrator 33, which may have an overview of the mobile edge system.

The mobile edge host level management (e.g., functions, elements) may comprise the mobile edge platform manager 32 and the virtualization infrastructure manager 31. The mobile edge host level management may handle (e.g., perform) the management of the mobile edge (e.g., specific) functionality of a (e.g., particular) mobile edge host 30 and the applications 301, 302, 303 running on that mobile edge host 30.

Example of Deployment of MEC in 5G

Mobile communications are in continuous evolution and are already at the doorsteps of its fifth incarnation, which is called 5th Generation, and may be referred to herein as any of 5G, NR, collectively 5G. ETSI MEC ISG published a white paper in June 2018 "MEC in 5G networks", illustrating how MEC may be deployed and integrated in the 5G architecture. The ETSI MEC ISG whitepaper focuses "on the opportunities for MEC to benefit from the edge computing enablers of the 5G system specification, and for 3GPP ecosystem to benefit from the MEC system and its APIs as a set of complementary capabilities to enable applications and services environments in the very edge of mobile networks".

For example, MEC may be mapped to applications functions (AF), as defined by 3GPP, that may use the services (e.g., and information) provided by other 3GPP network functions based on the configured policies. Enabling functionalities may allow to provide flexible support for different deployments of MEC and to support MEC in case of user mobility events.

Figure 4:
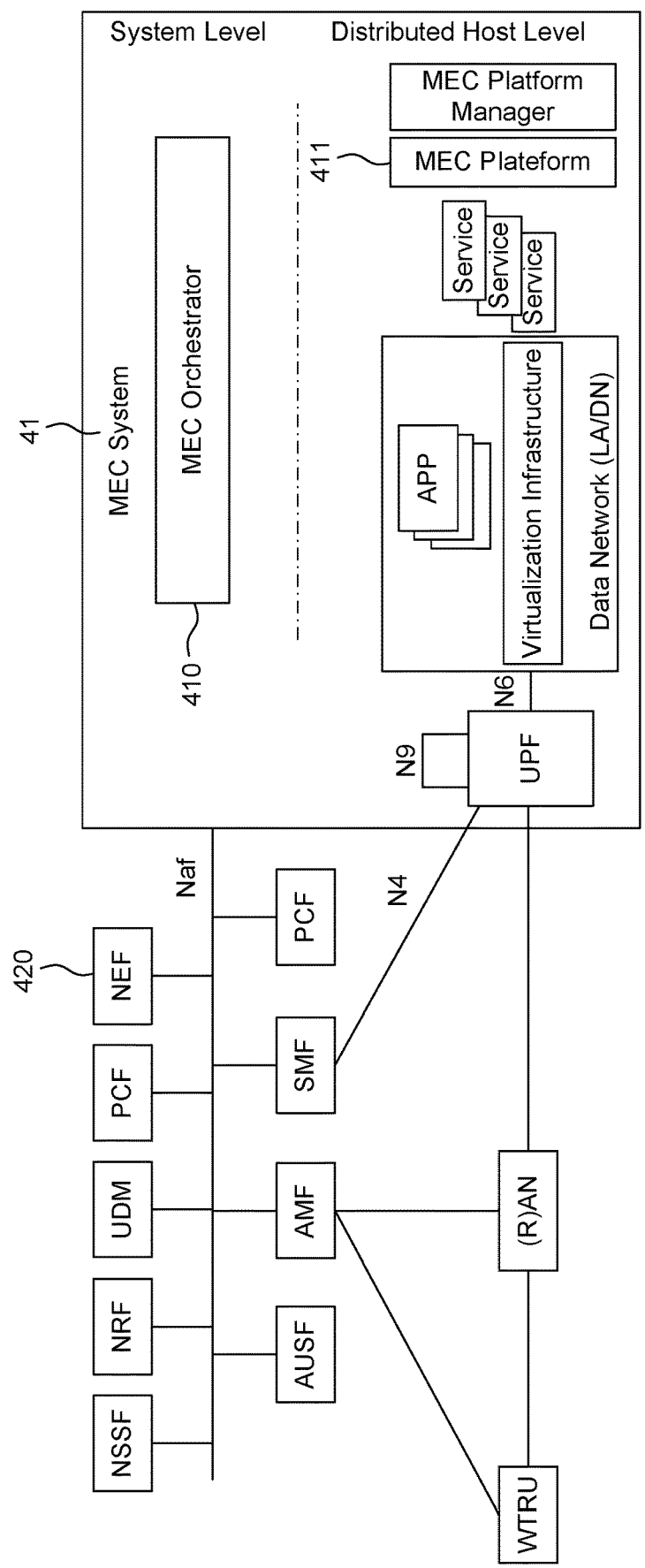
FIG. 4 is a system diagram illustrating an example of a MEC deployment.

FIG. 4 is a system diagram illustrating an example of a MEC deployment in a 5G network, e.g., as described in the ETSI MEC ISG whitepaper. A MEC system 41 may comprise a MEC orchestrator 410. The MEC orchestrator 410 may be a system level (e.g., functional) entity that, e.g., by acting as an AF, may interact with any of the network exposure function (NEF) 420, and (e.g., in some scenarios) with (e.g., target) 5G network functions (NFs). On the MEC host level, the MEC system 41 may comprise a MEC platform 411 that may interact with 5G NFs, for example, in the role of an AF. The MEC host, e.g., the host level functional entities (e.g., software components), may be deployed (e.g., located), for example, in a data network in the 5G system. The NEF, e.g., as a core network function may be a system level entity and may be deployed centrally together with other (e.g., similar) NFs. An instance of NEF may also be deployed in the edge to allow any of low latency and high throughput service access from a MEC host. The MEC may be deployed on the N6 reference point, for example, in a data network external to the 5G system.

According to embodiments, different MEC systems may be deployed. For example, MEC hosts may be deployed in the edge of a (e.g., data) network, and the user plane traffic may be steered towards (e.g., targeted) applications in the (e.g., data) network by the user plane function (UPF). In terms of physical deployment of MEC hosts, a MEC host may be collocated with the local UPF in a base station. In another example, a MEC host may be collocated with a transmission network element, e.g., with the local UPF. In yet another example, a MEC host and the local UPF may be collocated with a network aggregation point (e.g., network element). In yet another example, a MEC host may be collocated with the core network functions (e.g., in the same data center).

Reliable and Available Wireless (RAW) Examples

Deterministic networking may allow to carry any of unicast and multicast data streams for real-time applications with (e.g., extremely) low data loss rates and bounded latency. Deterministic networking may be based, for example, on any of time, resource reservation and policy enforcements by e.g., distributed shapers. Deterministic networking may allow to support any of time-sensitive and mission-critical applications on a (e.g., converged enterprise) infrastructure.

Wireless operates on a shared medium, and transmissions may not be fully deterministic due to, for example, uncontrolled interferences, including e.g., self-induced multipath fading. Reliable and available wireless (RAW) may provide deterministic networking across a path that may include a wireless interface (e.g., segment). RAW may provide high reliability and availability for IP connectivity over a wireless medium. The wireless medium may present challenges to obtain deterministic properties such as any of a low packet error rate, bounded consecutive losses, and bounded latency. For example, RAW may provide high reliability and availability in an IP network by utilizing scheduled wireless segments. For example, RAW may provide high reliability and availability in an IP network based on e.g., frequency/time-sharing physical media resources with stochastic traffic such e.g., as any of IEEE Std. 802.15.4 timeslotted channel hopping (TSCH), 3GPP 5G ultra-reliable low latency communications (URLLC), IEEE 802.11ax/be, and L-band Digital Aeronautical Communications System (LDACS), etc.

RAW technologies may allow to abstract the radio layers specificities, for addressing the Layer 3 aspects in support of applications expecting high reliability and availability. RAW may comprise a path computation element (PCE) and a path selection element (PSE). The PCE may (re)compute a (e.g., complex) path between a source and a destination. The (e.g., complex) path may comprise a set of (e.g., redundant) paths between the source and the destination, that may be referred to herein as tracks. The PCE may (re)compute a (e.g., set of redundant) path(s) at a path computation time scale, which may be different from the time scale at which the PSE may take a forwarding decision for any number of packets. For example, the PSE may select among the redundant paths obtained by the PCE which path may be used for a (e.g., each) packet to provide a reliable and available service while limiting (e.g., minimizing) the use (e.g., waste) of constrained resources. The PSE may be seen as the counter part of the PCE to perform (e.g., rapid, local) adjustments of the forwarding tables within the diversity of redundant paths that the PCE may have computed between the source and the destination. The PSE may allow to exploit the richer forwarding capabilities with Packet (hybrid) ARQ, Replication, Elimination and Ordering (PAREO), and scheduled transmissions (e.g., at a faster time scale).

For example, the PSE may obtain (e.g., compute, select) which of the available (e.g., redundant) tracks may be used on any of a flow and a packet basis. The PSE may determine which PAREO function(s) may be used, in order to provide the flow with a (e.g., given, expected) availability and reliability. The PSE may interact (e.g., exchange signaling messages) with the PCE and the RAW network elements so that the RAW network elements may setup the (e.g., appropriate) per-flow state, to, for example, recognize the flow and determine the forwarding policy to be applied. For example, signaling messages may include flow information indicating any of how a flow may be recognized (e.g., identified) and a forwarding policy to be applied to a flow by the RAW network element. For example, the RAW forwarding decisions may be distributed among the RAW network elements based on e.g., in-band signaling (e.g., extending any of segment routing, BIER-TE and DETNET tagging). In another example, the RAW forwarding decisions may be taken (e.g., autonomously) by forwarding network elements based on e.g., a local knowledge of the status of the network, for example, obtained via OAM RAW-specific mechanisms.

Industry 4.0 Example

Without limitation, Industry 4.0, which may also be referred to as wireless for industrial applications, may be used to illustrate embodiments described herein. Industry 4.0 may be based on 5G ultra reliable and low Latency communications (URLLC). For example, a control application of machinery may be run (e.g., executed) at the edge. The MEC technology may allow to provide (e.g., very) low latencies between any of the robots, the physical actuators and the control logic managing them. RAW may also allow to avoid using cables which may not be suited for robots and mobile vehicles which may (e.g., typically) be used in factories.

For example, control applications may be running at the edge (e.g., as MEC applications) and may expect any of (e.g., bounded) low latencies and a (e.g., guaranteed) availability, despite the mobility of the terminals and the changing wireless conditions. A WTRU may be, for example, an automated guided vehicle (AGV) in a factory. The WTRU may be controlled by a (e.g., any number of) MEC application(s). In this example, the connectivity from the WTRU to the MEC application(s) may be critical. The connectivity may include the backhaul network connecting any of the 3GPP RAN segment, the UPFs and any of the MEC hosts. Any of the network segments traversed by the traffic from the WTRU to the MEC application (e.g., and vice versa) may include a multi-hop wireless RAW-capable network, providing (e.g., guaranteed) reliability and availability.

According to embodiments, a WTRU may be aware of the reliability and availability that may be expected by any MEC applications e.g., used by the WTRU. The mechanisms standardized by ETSI MEC may not allow the WTRU to influence (e.g., control) jointly RAW and MEC components (e.g., network elements) that may be deployed in the (e.g., end to end) path.

Figure 5:
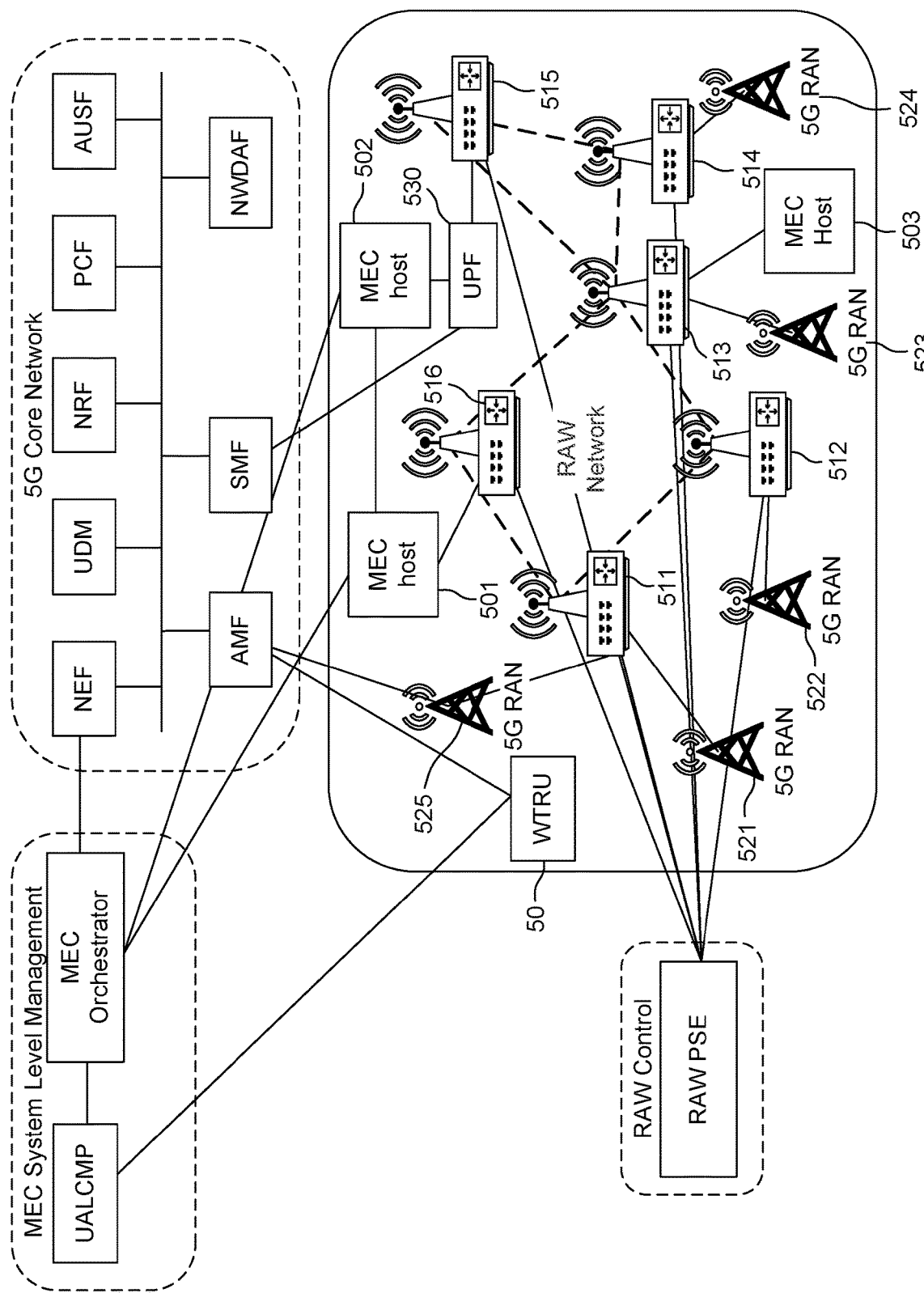
FIG. 5 is a system diagram illustrating an example of a system integrating MEC and RAW components with a 5G network.

FIG. 5 is a system diagram illustrating an example of a system integrating MEC and RAW components with a 5G network. The MEC system may include any number of MEC hosts 501, 502, 503 that may be deployed at the edge (e.g., of the 5G network). A RAW-capable wireless multi-hop backhaul segment 511, 512, 513, 514, 515, 516 may connect any of the RAN (e.g., network elements) 521, 522, 523, 524, 525, the MEC hosts 501, 502, 503 and the UPFs (e.g., network elements) 530. The system may be used, for example, in a factory where any number of robots and AGVs (collectively WTRUs) may be wirelessly connected, and e.g., controlled via remote applications. Control applications may be running, for example, as MEC applications, in MEC hosts in the edge. Control applications may expect (e.g., bounded low) latencies and a (e.g., guaranteed) availability, e.g., despite the mobility of the WTRUs and the changing wireless conditions. A heterogeneous wireless mesh network may be used to provide connectivity inside the factory. Throughout embodiments described herein a MEC system including MEC components and RAW network elements (as described in FIG. 5) may be referred to herein as "MEC system".

For example, the WTRU may be moving and the wireless conditions may vary. Embodiments described herein may allow to select the host where any MEC application (e.g., used by the WTRU) may be instantiated. Embodiments described herein may allow to configure (e.g., and monitor) the RAW network for ensuring (e.g., guaranteeing) connectivity availability and reliability between the WTRU and the MEC application (e.g., instance). Embodiments described herein may allow to address any of the MEC host selection and RAW network configuration/monitoring from an over the top perspective, e.g., without using control mechanisms of 5G 3GPP networks.

For example, the WTRU may be capable of determining (e.g., identifying, indicating, transmitting) a (e.g., specific level of) availability and reliability for instantiating a MEC application. The WTRU may be capable of receiving (e.g., status) updates in order to react to these updates, for example, at the application level.

Embodiments described herein may allow to enable a WTRU to influence (e.g., parametrize, force) the selection of the host where the MEC application(s) may be instantiated. Embodiments described herein may allow the WTRU to influence (e.g., trigger) the (re-)configuration of the RAW network between the WTRU and the MEC application(s) host. For example, embodiments described herein may allow a WTRU to request (e.g., its own) reliability and availability characteristics (e.g., levels, attributes) to a RAW-enabled 5G network, for example, in conjunction with a MEC application instantiation. Throughout embodiments described herein the terms "reliability and availability characteristic (s)", and "reliability and availability attribute(s)" may be used interchangeably.

Embodiments described herein may not be limited to (e.g., IETF) RAW networks. Any network capable of ensuring reliability and availability (such as e.g., a deterministic networking (DETNET) time sensitive network (TSN)) may be applicable to embodiments described herein. Any network element with reliability and availability capability may be referred to herein as a RAW network element. Any deterministic networking control entity may be referred to herein as any of a RAW PSE and a RAW control entity (RAW ctrl).

Embodiments described herein may allow a WTRU to (e.g., concurrently, jointly) influence (i) the selection of a MEC host for instantiation of the WTRU-targeted MEC application(s) (e.g., and functions), and (ii) the (re)configuration of the RAW network (e.g., element, segment) connecting the WTRU to the selected MEC host.

Embodiments described herein may allow the WTRU to discover any RAW-enabled network (e.g., element, segment) on the path between the WTRU and the MEC application host, and the (e.g., associated) RAW network capabilities. This may be achieved, for example, by enabling the user life cycle management proxy (UALCMP) and the MEC platform to interact with the RAW PSE to obtain information about the capabilities of the RAW network interconnecting the available MEC host(s) and the WTRU.

Embodiments described herein may allow the WTRU to request a (e.g., desired) reliability and availability level (e.g., characteristics) for (e.g., both) the MEC host and the RAW network (e.g., the MEC system). In other words, embodiments described herein may allow the WTRU to request reliability and availability requirements to be met (e.g., simultaneously, at a same time) by the MEC host and the RAW network. The MEC system level management may determine a MEC host (e.g., for instantiating the MEC application) for obtaining the requested reliability and availability level based on the (e.g., knowledge of the) available MEC hosts and the RAW network (e.g., via interaction with the PSE) interconnecting the available MEC hosts with the WTRU. The MEC system level management may instruct the RAW network (e.g., via the PSE) to configure the corresponding RAW network element(s) (e.g., involved in a path between the selected MEC host and the WTRU).

Embodiments described herein may allow the WTRU to be notified (e.g., directly) by the RAW network, for example, to enable end to end application level adaptation (e.g., optimization).

Figure 6:
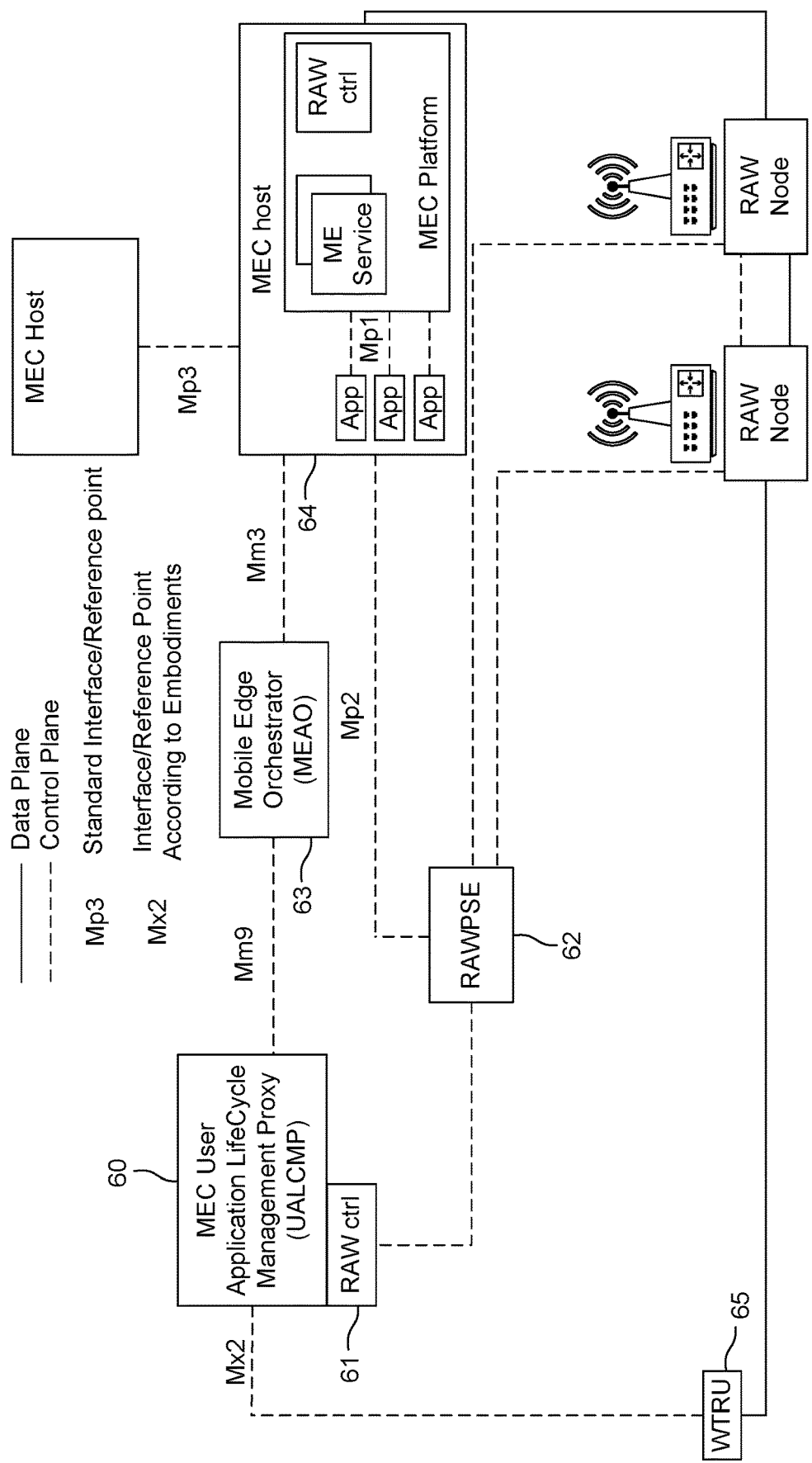
FIG. 6 is a system diagram illustrating an example of a system including components and interfaces for a joint selection of a MEC host and configuration of the RAW network.

FIG. 6 is a system diagram illustrating an example of a system including components and interfaces for a joint selection of a MEC host and configuration of the RAW network. According to embodiments, the MEC UALCMP 60 (e.g., network element) may comprise a RAW controller 61 (RAW ctrl) functionality (e.g., component). For example, the RAW ctrl 61 may enable a WTRU 65 to learn (e.g., receive information) about the RAW and MEC capabilities of the 5G network it may be connected to. For example, the RAW ctrl 61 may enable the WTRU 65 to request a level of availability and reliability (e.g., indicate its requirements in terms of availability and reliability) for joint MEC application instantiation and RAW network configuration.

According to embodiments, the Mx2 interface between the WTRU 65 and the UALCMP 60 network element, the Mm9 interface between the UALCMP 60 network element and the mobile edge orchestrator 63 (MEAO) network element, and the Mm3 interfaces between the MEAO 63 network element and the MEC host 64 may be used to exchange (e.g., dedicated) RAW semantics (e.g., indications). An interface between the RAW ctrl 61 and the RAW PSE network element may be used to exchange (e.g., signaling) messages.

Example of User Application Look-Up for Supporting Reliability and Availability Information The user application look-up (e.g., procedure) may allow a WTRU (e.g., application) to request the list of user applications (e.g., MEC applications) in the MEC system that may be available to the requesting WTRU (e.g., application). User applications may be referred to herein as MEC applications.

According to embodiments, a WTRU may be capable of discovering a RAW network on the path to a host running a (e.g., target) MEC application. For example, the WTRU may obtain information (e.g., indications) on reliability and availability (e.g., configuration) of the RAW network.

Figure 7:
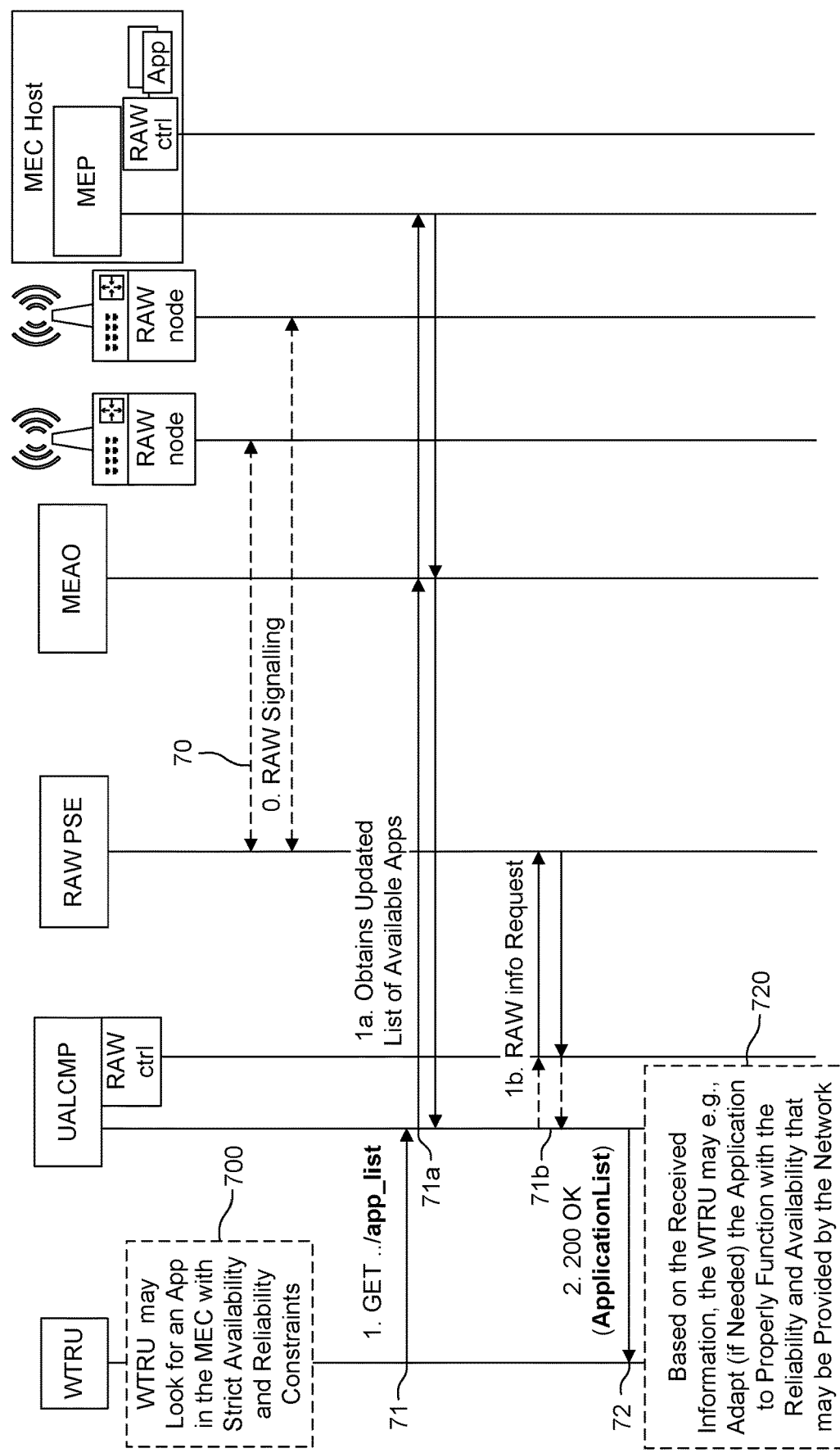
FIG. 7 is a diagram illustrating an example of a signaling exchange for a user application look-up procedure.

FIG. 7 is a diagram illustrating an example of a signaling exchange for a user application look-up procedure. For example, in a step 700, the WTRU may search (e.g., look for) a MEC application with (e.g., strict) availability and reliability characteristics (e.g., constraints). For example, any number of MEC applications with (e.g., strict) availability and reliability characteristics (e.g., constraints) may (e.g., already) be running in the MEC system.

According to embodiments, a RAW network may provide reliable and available wireless networking, for example, to any of the WTRU and any number of MEC hosts. The RAW network may comprise a RAW PSE and any number of RAW network elements (e.g., nodes), such as e.g., WTRUs. For example, a WTRU may comprise (e.g., operate as) a RAW network element. For example, signaling messages 70 may be exchanged between the PSE and any of the RAW network elements for providing reliable and available wireless networking. For example, a RAW network element may exchange (e.g., any of receive and transmit) signaling messages 70 including flow information indicating any of how a flow may be recognized (e.g., identified) and a forwarding policy to be applied to a flow by the RAW network element.

According to embodiments, the WTRU may send a request message 71 (which may be referred to herein as "GET") to the UALCMP network element for requesting the list of (e.g., user, MEC) applications that may be available to the requesting WTRU (e.g., application). For example, the GET request message 71 may include an information (e.g., element) indicating that the WTRU may be interested in receiving reliability and availability information (e.g., capabilities) of (e.g., supported by) the MEC system. The information (e.g., element) may be any kind of data representation capable of indicating a request for receiving reliability and availability information (e.g., capabilities) supported by the MEC system. For example, the UALCMP network element may authorize the request from the WTRU (e.g., application).

According to embodiments, the MEC system may retrieve the list of MEC applications that may be available to the requesting WTRU. For example, the UALCMP may exchange signaling messages 71a with the MEC application orchestrator (MEAO) network element for requesting and receiving the list of MEC applications.

According to embodiments, the UALCMP network element may send a request message 71b (that may be referred to herein as "RAW info request") to the PSE network element for requesting, for example, information related to reliability and availability. For example, the UALCMP network element may obtain reliability and availability information for path(s) between the WTRU and any number of MEC hosts where MEC applications may be instantiated. The RAW info request message 71b may be sent, for example, via a RAW ctrl (e.g., logical) component. In another example, the RAW info request message 71b may be sent by the UALCMP network element (e.g., without using any RAW ctrl component).

According to embodiments, the WTRU may receive a message 72 (which may be referred to herein as "200 OK response"), from the UALCMP network element. The 200 OK response message 72 may include, e.g., in the message body a data structure that may indicate the list of available user applications, MEC applications, collectively "applications". The data structure may include information about an application, such as e.g., any of an application identifier, an application name, an application provider, an application software version, an application description, application characteristics (e.g., any of memory, storage, latency, bandwidth, service continuity). According to embodiments, the data structure may include (e.g., additional) information about (e.g., indicating) reliability and availability characteristics that may be supported by the MEC system, for example, as described in Table 1, and that may be referred to herein as "supported" reliability and availability characteristics. According to embodiments, information about supported reliability and availability characteristics (that may be included in the 200 OK response message 72) may include any of an (e.g., ensured) latency attribute, an (e.g., ensured) bandwidth attribute, an (e.g., ensured) reliability attribute, an (e.g., ensured) jitter attribute and an (e.g., ensured) redundancy attribute. By "ensured" it is means throughout embodiments described herein that the corresponding parameter value may be guaranteed with a reasonable (e.g., high) level of confidence.

According to embodiments, the (e.g., ensured) latency attribute may indicate a supported latency such as e.g., a round-trip time, for example, in milliseconds, that may be supported (e.g., provided) by the MEC system for a corresponding application instance. For example, the round-trip time may be guaranteed by the MEC system.

According to embodiments, the (e.g., ensured) bandwidth attribute may indicate the supported bandwidth (e.g., of a connection) that may be used by a corresponding application instance, for example, in kbit/s. The indicated supported bandwidth may be guaranteed by the MEC system.

According to embodiments, the (e.g., ensured) reliability attribute may indicate a supported reliability such as e.g., a (e.g., percentage of) packet transmission failure. For example, the (e.g., ensured) reliability attribute may indicate the upper bound (e.g., maximum) of packet transmission failure that may occur in the connection.

According to embodiments, the (e.g., ensured) jitter attribute may indicate a supported jitter such as e.g., a (e.g., maximum) amount of jitter that may occur for a corresponding application instance.

According to embodiments, the (e.g., ensured) redundancy attribute may indicate the supported path redundancy such as e.g., a (e.g., minimum) number of redundant paths that may be supported (e.g., provided) by the MEC system for a corresponding application instance.

According to embodiments, the presence of any of the supported reliability and availability characteristics (e.g., indication) in the received message 72 may indicate to the WTRU the presence of at least one RAW network segment connecting the WTRU to a (e.g., target) MEC host (e.g., associated with the application).

Table 1 describes supported reliability and availability attributes that may be included in a 200 OK response message 72 of the user application look-up procedure. Tables 1, 2 and 3 describe the attributes in the form of a data model, where the signs ">", ">>", ">>>" may indicate different levels of hierarchy in the data model. For example, ">appInfo", followed by ">>appRelAval" may indicate that "appRelAval" may be a sub attribute of "appinfo". Units (milliseconds, kbits/s) are given in Tables 1, 2, and 3 as a matter of possible examples. Any other kind of units and parameter encoding may be applicable to embodiments described herein.

TABLE 1

Reliability and availability attributes for user application look-up

| Attribute name | Data type | Cardinality | Description |
| --- | --- | --- | --- |
| appList | Array (Structure (inlined)) | 0 . . . N | List of user applications available to the device application. As defined below. |
| >appInfo | Structure (inlined) | 1 | |
| >>appRelAval | Structure (inlined) | 0 . . . 1 | Reliability and availability characteristics of the application and its connectivity. As defined below. |
| >>>ensuredLat | uint32 | 0 . . . 1 | The ensured round trip time in milliseconds supported by the MEC system for the MEC application instance. |
| >>>ensuredBW | uint32 | 0 . . . 1 | The ensured connection bandwidth in kbit/s for the use of the MEC application instance. |
| >>>ensuredRel | float | 0 . . . 1 | The maximum percentage of packets failed. |
| >>>ensuredJit | uint32 | 0 . . . 1 | The ensured jitter in milliseconds supported by the MEC system for the MEC application instance. |
| >>>ensuredRed | uint32 | 0 . . . 1 | The ensured number of redundant paths supported by the MEC system for the MEC application instance. |

According to embodiments, the information indicating reliability and availability characteristics that may be supported by the MEC system (e.g., for a MEC application) may be used by the WTRU to determine whether the reliability and availability expectations (e.g., requirements) of a (e.g., WTRU) application may be met or not. In case the received information indicates that the expectations of the (e.g., WTRU) application in terms of reliability and availability may not be met (e.g., satisfied), the WTRU may adapt (e.g., reconfigure) the application e.g., to fewer demanding expectations. For example, in an industrial control application, the speed of the controlled robot may be reduced. According to embodiments, the WTRU may use this information to explore (e.g., retrieve information from), for example, other access networks.

According to embodiments, a WTRU may receive information about reliability and availability in the 200 OK response message 72, without having requested it. For example, the WTRU may send a GET request message 71 to the UALCMP network element for requesting the list of applications without including any information element for requesting (e.g., supported) reliability and availability information. For example, the UALCMP network element may (e.g., decide to) transmit (e.g., supported) reliability and availability information as described in Table 1, for example, based on its own logic (e.g., policies).

Example of Application Context Create for Supporting Reliability and Availability Information The application context create (e.g., procedure) may allow a WTRU (e.g., application) to request any of joining an available MEC application (e.g., running in a MEC host) and instantiating a new MEC application (e.g., in a MEC host).

According to embodiments, a WTRU may be capable of requesting the creation (e.g., instantiation) of a MEC application including reliability and availability characteristics (e.g., parameters).

Figure 8:
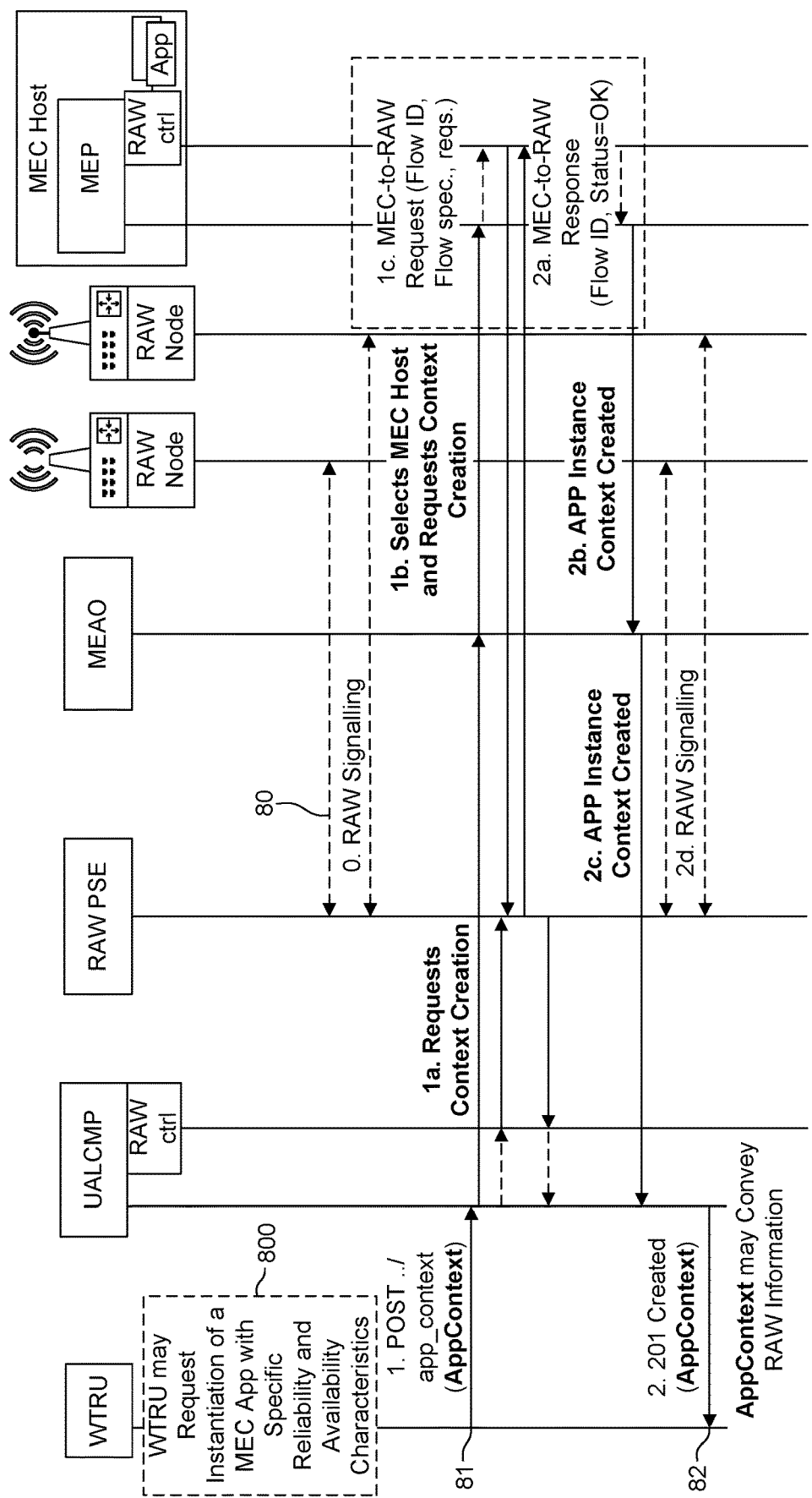
FIG. 8 is a diagram illustrating an example of a signaling exchange for an application context create procedure.

FIG. 8 is a diagram illustrating an example of a signaling exchange for an application context create procedure. For example, in a step 800, the WTRU may request instantiation of an application with any of (e.g., specific, strict) availability and reliability characteristics (e.g., constraints). For example, the application instantiation may be requested with (e.g., requested) availability and reliability characteristics that may be based on any of the (e.g., supported) availability and reliability characteristics (e.g., supported by the MEC system). In another example, (not illustrated), an application instantiation with any of (e.g., specific, strict) availability and reliability characteristics (e.g., constraints) may be initiated, e.g., as part of the WTRU initialization.

According to embodiments, a RAW network may provide reliable and available wireless networking, for example, to any of the WTRU and any number of MEC hosts. The RAW network may comprise a RAW PSE and any number of RAW network elements (e.g., nodes), such as e.g., WTRUs. For example, a WTRU may comprise (e.g., operate as) a RAW network element. For example, signaling messages 80 may be exchanged between the PSE and any of the RAW network elements for providing reliable and available wireless networking. For example, a RAW network element may exchange (e.g., any of receive and transmit) signaling messages 80 including flow information indicating any of how a flow may be recognized (e.g., identified) and a forwarding policy to be applied to a flow by the RAW network element.

According to embodiments, the WTRU may submit (e.g., send) a request message 81 (that may be referred to herein as "POST") to the MEC system (e.g., UALCMP network element) for requesting (e.g., indicating a request for) e.g., any of joining an available (e.g., user, MEC) application and instantiating a new (e.g., user, MEC) application. For example, the request message 81 may indicate that an application context creation is requested. The POST request message 81 body may include a data structure that may indicate the application context (e.g., to be created). The MEC system may create an (e.g., associated) application context that the MEC system may maintain, for example, for the lifetime of the (e.g., user, MEC) application. The application context (e.g., data structure that may be included in the request message 81) may include information for (e.g., specific to) the instance(s) of the (e.g., user, MEC) application such as any of (e.g., unique) identifiers within the MEC system and the address(es) (URI) provided for clients that may be external to the MEC system to interact with the (e.g., user, MEC) application. According to embodiments, the application context (e.g., data structure that may be included in the request message 81) may include (e.g., additional) application context create look-up procedure for requesting reliability and availability characteristics.

TABLE 2

Reliability and availability attributes for application context

| Attribute name | Data type | Cardinality | Description |
|---|---|---|---|
| appList | Array (Structure (inlined)) | 0 . . . N | List of user applications available to the device application. As defined below. |
| >appInfo | Structure (inlined) | 1 | |
| >>appRelAval | Structure (inlined) | 0 . . . 1 | Reliability and availability characteristics of the application and its connectivity. As defined below. |
| >>>ensuredLat | uint32 | 0 . . . 1 | The requested ensured round-trip time in milliseconds to be provided by the MEC system for the MEC application instance. |
| >>>ensuredBW | uint32 | 0 . . . 1 | The requested ensured connection bandwidth in kbit/s for the use of the MEC application instance. |
| >>>ensuredRel | float | 0 . . . 1 | The requested maximum percentage of packets failed. |
| >>>ensuredJit | uint32 | 0 . . . 1 | The requested ensured jitter in milliseconds to be provided by the MEC system for the MEC application instance. |
| >>>ensuredRed | uint32 | 0 . . . 1 | The requested ensured number of redundant paths to be provided by the MEC system for the MEC application instance. | information indicating (e.g., requested) reliability and availability characteristics, for example, as described in Table 2. According to embodiments, information indicating requested reliability and availability characteristics (that may be included in POST request message 81) may include (e.g., indicate) any of an (e.g., ensured) latency attribute, an (e.g., ensured) bandwidth attribute, an (e.g., ensured) reliability attribute, an (e.g., ensured) jitter attribute, and an (e.g., ensured) redundancy attribute.

According to embodiments, the (e.g., ensured) latency attribute may indicate a requested latency such as e.g., a round-trip time, for example, in milliseconds, that may be provided by (e.g., requested to) the MEC system for a corresponding application instance. For example, the requested round-trip time may be guaranteed by the MEC system.

According to embodiments, the (e.g., ensured) bandwidth attribute may indicate a requested bandwidth e.g., for a connection that may be used by a corresponding application instance, for example, in kbit/s. The requested bandwidth may be guaranteed by the MEC system.

According to embodiments, the (e.g., ensured) reliability attribute may indicate a requested reliability such as e.g., a (e.g., percentage of) packet transmission failure. For example, the (e.g., ensured) reliability attribute may indicate the upper bound (e.g., maximum) of packet transmission failure that may be requested for the connection.

According to embodiments, the (e.g., ensured) jitter attribute may indicate a requested jitter such as e.g., a (e.g., maximum amount of) jitter that may occur for a corresponding application instance.

According to embodiments, the (e.g., ensured) redundancy attribute may indicate the requested path redundancy such as e.g., a (e.g., minimum) number of redundant paths that may be provided by the MEC system for a corresponding application instance.

Table 2 describes reliability and availability attributes that may be included in POST request message 81 of the For example, the UALCMP network element may authorize the request from the WTRU (e.g., application). The request message may be forwarded to the MEC system level management, for (e.g., decision on) granting the context creation request. The MEC orchestrator network element may initiate (e.g., trigger) the creation of the application context in the MEC system, including (e.g., taking into account) the information about reliability and availability characteristics, as described, for example by steps 1a to 1c.

According to embodiments, in the step 1a, the UALCMP network element may send a request message to the MEAO network element for requesting the context creation. The request message may include the reliability and availability characteristics of (e.g., requested by) the application.

According to embodiments, in the step 1b, the MEAO network element may determine (e.g., select) a MEC host (e.g., and the MEC platform) based on the requested reliability and availability characteristics (e.g., so that (e.g., all) the reliability and availability requirements of the application may be met).

According to embodiments, in the step 1c, the MEC platform (MEP) may request the local RAW ctrl to establish the connectivity between the MEC application (e.g., running in the MEC host) and the WTRU based on the requested reliability and availability characteristics. For example, any of the RAW ctrl, the PSE and RAW network elements that may be part of the established path(s) may interact (e.g., exchange messages) for establishing the connectivity (e.g., path setup) that may match the requested reliability and availability characteristics between the application MEC host and the WTRU.

According to embodiments, in the step 2, the WTRU may receive a response message 81 (that may be referred to herein as "201 created"). The UALCMP network element may return (e.g., send) the 201 created response message 81 to the WTRU to indicate that an application context may have been created. The 201 created response message 81 may have a message body including the data structure of the created application context. The 201 created response message 81 body may include any attributes described in Table 2.

According to embodiments, in the step 2*a*, the MEC platform may receive an indication (e.g., response) from the RAW ctrl that path(s) may have been setup.

According to embodiments, in the step 2*b*, the MEAO network element may be notified (e.g., sent a message indicating) that the MEC application may have been instantiated and that a connectivity may have been set-up, based on the requested reliability and availability characteristics. For example, the message may indicate reliability and availability characteristics, based on which the MEC application may have been instantiated and the network connectivity may have been established.

According to embodiments, in the step 2*c*, the UALCMP network element may be notified of (receive a message indicating) the application context creation. For example, the WTRU may receive the 201 created response message 82. The 201 created response message 82 may indicate acceptation by the MEC system of any of the requested availability and reliability characteristics e.g., for the (e.g., instantiated) MEC application. The 201 created response message may comprise an information (e.g., of any type) indicating the acceptation. For example, the information may comprise the application context (and the corresponding attributes) associated with the (e.g., instantiated) MEC application. The application context may include reliability and availability attributes indicating the reliability and availability characteristics provided (e.g., guaranteed) by the MEC system for the (e.g., instantiated) MEC application. For example, any of the provided (e.g., guaranteed) reliability and availability characteristics may be the same as any of the requested reliability and availability characteristics. In another example, any of the provided (e.g., guaranteed) reliability and availability characteristics may be different (e.g., lower) than any of the requested reliability and availability characteristics.

Example of Application Context Update for Supporting Reliability and Availability Information The application context update (e.g., procedure) may allow a WTRU (e.g., application) to update an (e.g., already created) application context.

According to embodiments, a WTRU may be capable of requesting an update of the context of a MEC application that may include reliability and availability characteristics (e.g., parameters). For example, an application context that may have been created, e.g., without any reliability and availability characteristics, may be updated with (e.g., new) reliability and availability characteristics. In another example, an application context that may have been created, with reliability and availability characteristics, may be updated with (e.g., different, new) reliability and availability characteristics.

Figure 9:
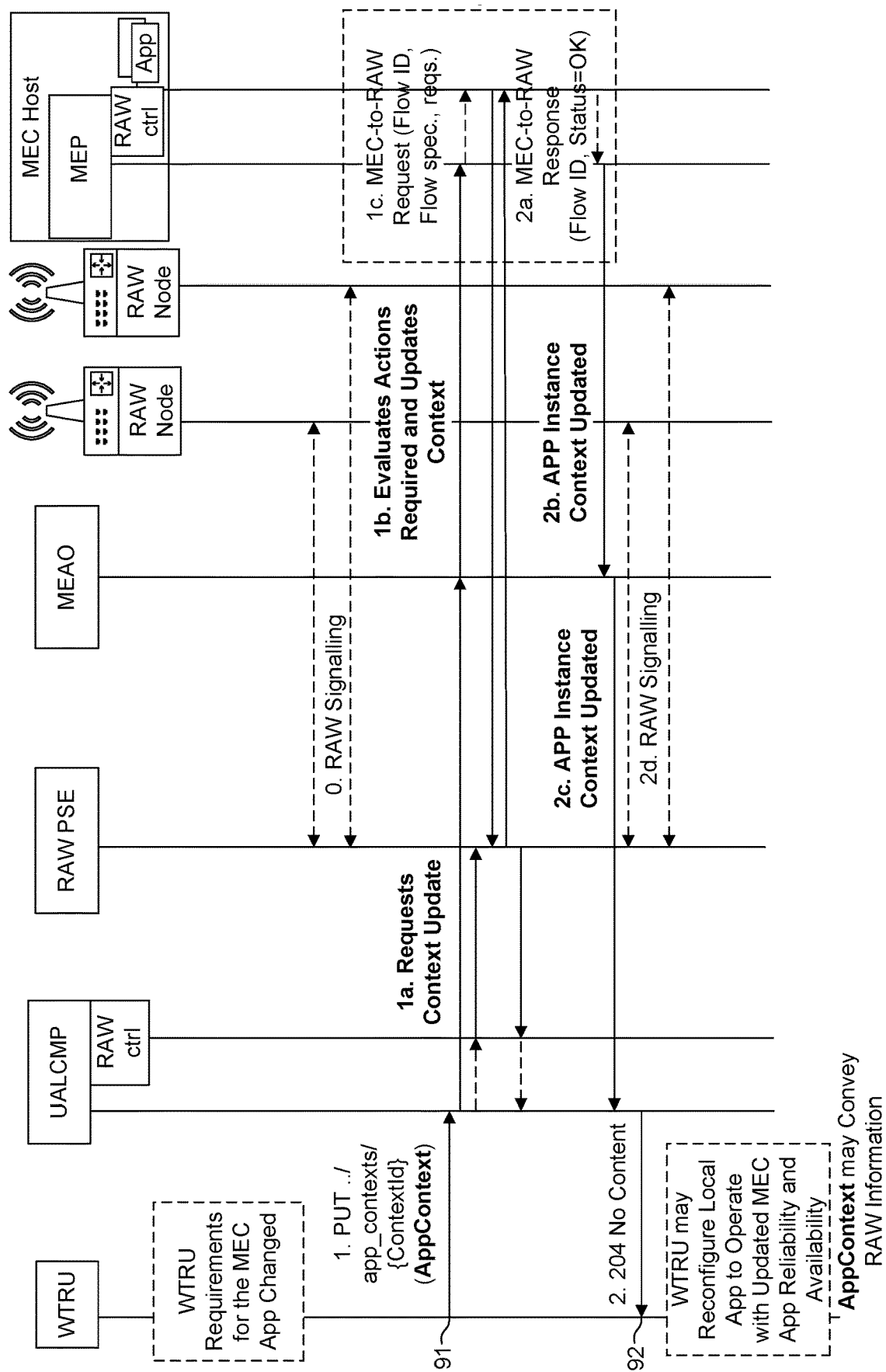
FIG. 9 is a diagram illustrating an example of a signaling exchange for an application context update procedure.

FIG. 9 is a diagram illustrating an example of a signaling exchange for an application context update procedure.

According to embodiments, an application (e.g., running in a WTRU) and using a MEC application may change reliability and availability characteristics for any of the MEC application and the network connectivity. For example, in an Industry 4.0 example, a robot control application may request e.g., less latency to e.g., improve its precision.

According to embodiments, the WTRU may update a (e.g., specific) application context by sending a request message 91 (that may be referred to herein as "PUT") e.g., to the resource within the MEC system that may represent it, with a message body including an application context data structure in which any of the callback reference, application location constraints (e.g. parameters), and application reliability and availability characteristics as described in Table 2 (e.g., any of bandwidth, latency and reliability) may be updated. For example, the request message 91 may include updated context information indicating an updated context associated with the application. For example, the request message 91 may include updated reliability and availability characteristics that may correspond to any of the (e.g., requested, provided) reliability and availability characteristics as described in Table 2, with new (updated) values. For example, any of the updated reliability and availability characteristics may include any of a new latency, a new bandwidth, a new reliability, a new jitter and a new path redundancy.

According to embodiments, the WTRU may receive a response message 92 (that may be referred to herein as "204 no content"), for example, to indicate that the application context may have been (e.g., successfully) updated.

Example of Receiving Notification Events

According to embodiments, a WTRU may be capable of receiving (e.g., information indicating) updates about the RAW connectivity that may be experienced by a MEC application. Receiving (e.g., RAW) connectivity update information may allow the WTRU to adapt (e.g., react in time) to these changes. For example, the WTRU may perform application level adaptation. In another example, the WTRU may select any of another point of attachment and another slice.

Figure 10:
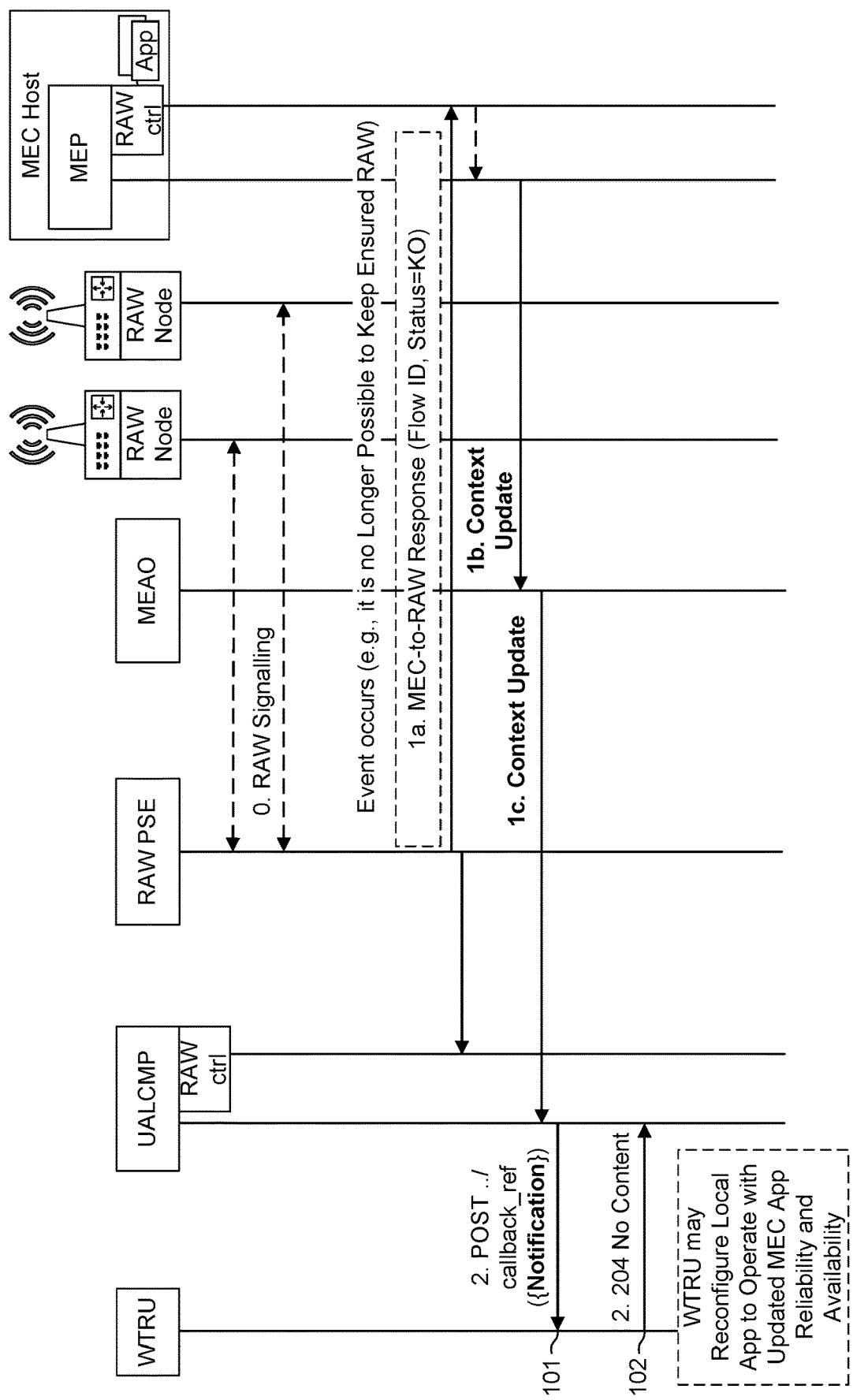
FIG. 10 is a diagram illustrating an example of a signaling exchange for receiving notification events.

FIG. 10 is a diagram illustrating an example of a signaling exchange for receiving notification events. For example, an event may occur in the RAW network that may prevent to maintain the reliability and availability characteristics (e.g., that may have been previously created or updated). The change in the RAW network may be detected via any mechanism, such as e.g., and without limitation an operation and maintenance (OAM) mechanism.

For example, in a step 1*a*, the MEC platform may be notified of (e.g., receive a notification message indicating) a RAW condition change.

For example, in a step 1*b*, this event may reach the MEAO network element, e.g., in the form of a context update (e.g., notification) message.

For example, in a step 1*c*, the context update message (e.g., notification) message may be forwarded the UALCMP network element.

According to embodiments, the UALCMP network element may send a POST message 1010 (that may be referred to a "POST") to the callback reference address that may have been provided by the WTRU application e.g., as part of application context creation, with the message body including a {Notification} data structure. The WTRU, that may have provided the callback reference address, may receive the POST message 1010 from the UALCMP network element. The {Notification} data structure may allow to indicate different notification events. For example, the {Notification} data structure may include any data type described in clauses 6.4.2 through 6.4.4 of ETSI GS MEC 016 V2.2.1 (2020-04) "Multi-access Edge Computing (MEC); Device application interface"

According to embodiments, the {Notification} data structure may include an application reliability and availability context update notification type as described in Table 3, for indicating a modification to the RAW conditions that may be made available to the (e.g., user, MEC) application instance.

According to embodiments, a notification of type application reliability and availability context update notification (which may be referred to herein as "ApplicationRelAvalContextUpdateNotification") may include any of a context identifier attribute and a user application instance information attribute. The user application instance information attribute may include any of an application instance identifier attribute, an (e.g., ensured) latency attribute, an (e.g., ensured) bandwidth attribute, an (e.g., ensured) reliability attribute, an (e.g., ensured) jitter attribute, and an (e.g., ensured) redundancy attribute. For example, the notification message may indicate any of an updated latency, an updated bandwidth, an updated reliability, an updated jitter and an updated path redundancy, as described in Table 3.

For example, the second response message may comprise an application context indicating the reliability and availability characteristics provided by the MEC system to the at least one application.

For example, the first request message may comprise an indication that the supported reliability and availability information may be requested.

For example, the second request message may be transmitted for requesting any of an application context creation and an application context update in the MEC system.

TABLE 3

Reliability and availability attributes for notification events

| Attribute name | Data type | Cardinality | Description |
| --- | --- | --- | --- |
| notification Type | String | 1 | may be set to "ApplicationRelAvalContextUpdateNotification" |
| contextId | String | 1 | Uniquely identifying the application context in the MEC system. |
| userAppInstance Info | array (Structure inlined) | 1 . . . N | List of user application instance information. |
| >appInstanceId | String | 1 | Identifier of the user application instance. |
| >ensuredLat | uint32 | 0 . . . 1 | Updated ensured round trip time in milliseconds supported by the MEC system for the MEC application instance. |
| >ensuredBW | uint32 | 0 . . . 1 | Updated ensured connection bandwidth in kbit/s for the use of the MEC application instance. |
| >ensuredRel | Float | 0 . . . 1 | Updated maximum percentage of packets failed. |
| >ensuredJit | uint32 | 0 . . . 1 | Updated ensured jitter in milliseconds supported by the MEC system for the MEC application instance. |
| >ensuredRed | uint32 | 0 . . . 1 | Updated ensured number of redundant paths supported by the MEC system for the MEC application instance. |

According to embodiments, the WTRU may respond to the UALCMP network element by sending a message 1020 (which may be referred to herein as "204 no content"), e.g., indicating that the notification message has been received.

According to embodiments, the WTRU may reconfigure the local application for operating (e.g., adapting to) the updated reliability and availability characteristics.

Figure 11:
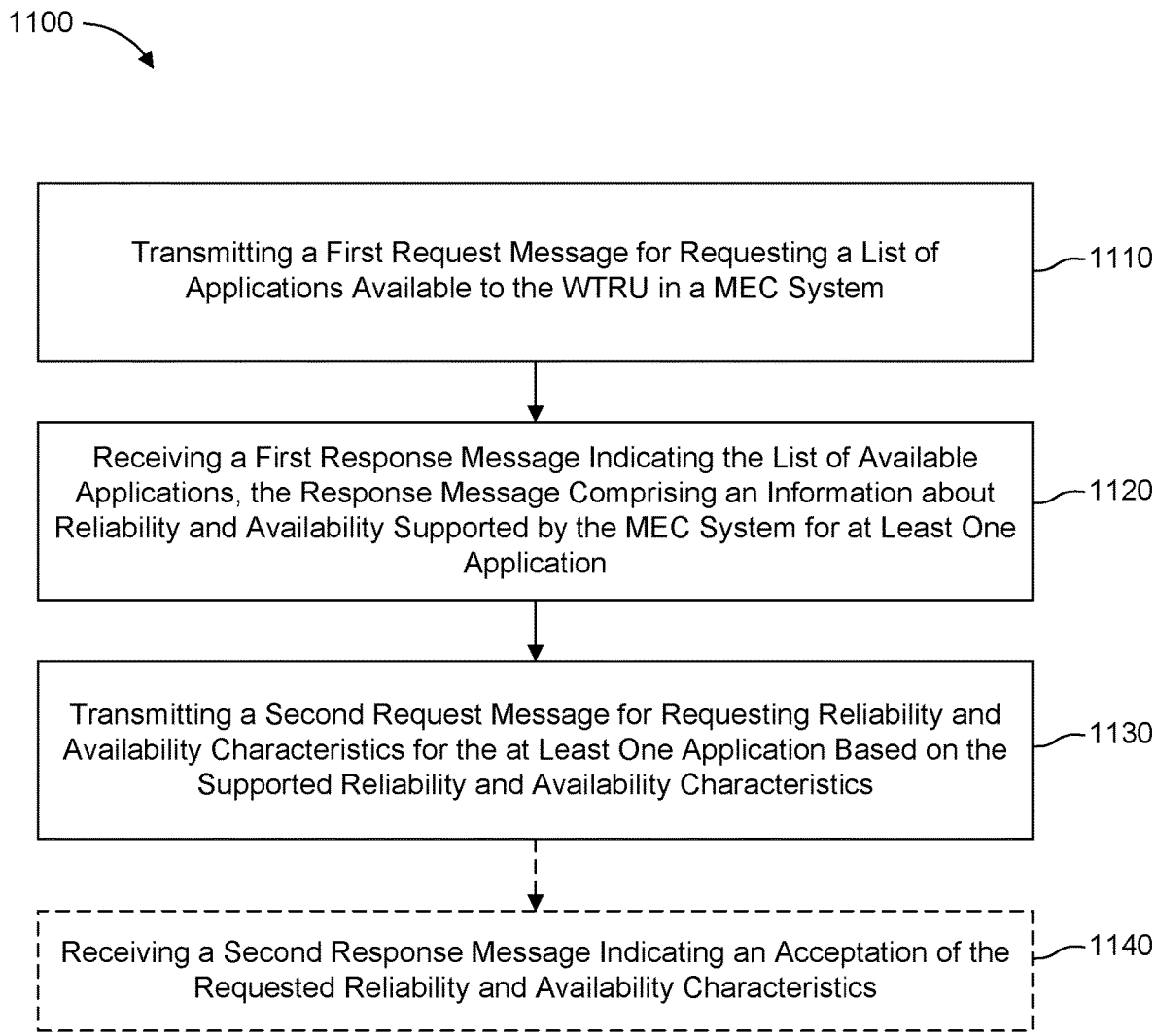
FIG. 11 is a diagram illustrating an example of a method for jointly selecting and configuring a MEC host and a RAW network.

FIG. 11 is a diagram illustrating an example of a method 1100 for jointly selecting and configuring a MEC host and a RAW network.

According to embodiments, in a step 1110, a WTRU may be configured to transmit a first request message for requesting a list of applications available to the WTRU in a MEC system.

According to embodiments, in a step 1120, the WTRU may be configured to receive a first response message indicating the list of available applications. The response message may comprise an information about reliability and availability that may be supported by the MEC system for at least one application of the list of applications.

According to embodiments, in a step 1130, the WTRU may be configured to transmit a second request message for requesting reliability and availability characteristics for the at least one application based on the supported reliability and availability information.

According to embodiments, in a step 1140, the WTRU may be configured to receive a second response message, that may indicate an acceptance of the requested reliability and availability characteristics.

For example, the requested reliability and availability characteristics may be compatible with (e.g., comprised in the range of) the supported reliability and availability information.

For example, the WTRU may be further configured to receive a notification message that may indicate a change of at least one of the reliability and availability characteristics provided by the MEC system to the at least one application.

For example, the supported reliability and availability information may comprise any of a latency attribute, a bandwidth attribute, a reliability attribute, a jitter attribute and a redundancy attribute indicating parameter values supported by the MEC system for the at least one application.

For example, the requested reliability and availability characteristics may comprise any of a latency attribute, a bandwidth attribute, a reliability attribute, a jitter attribute and a redundancy attribute indicating parameter values requested by the WTRU to the MEC system for the at least one application.

For example, the provided reliability and availability characteristics may comprise any of a latency attribute, a bandwidth attribute, a reliability attribute, a jitter attribute and a redundancy attribute indicating parameter values provided by the MEC system to the at least one application.

Figure 12:
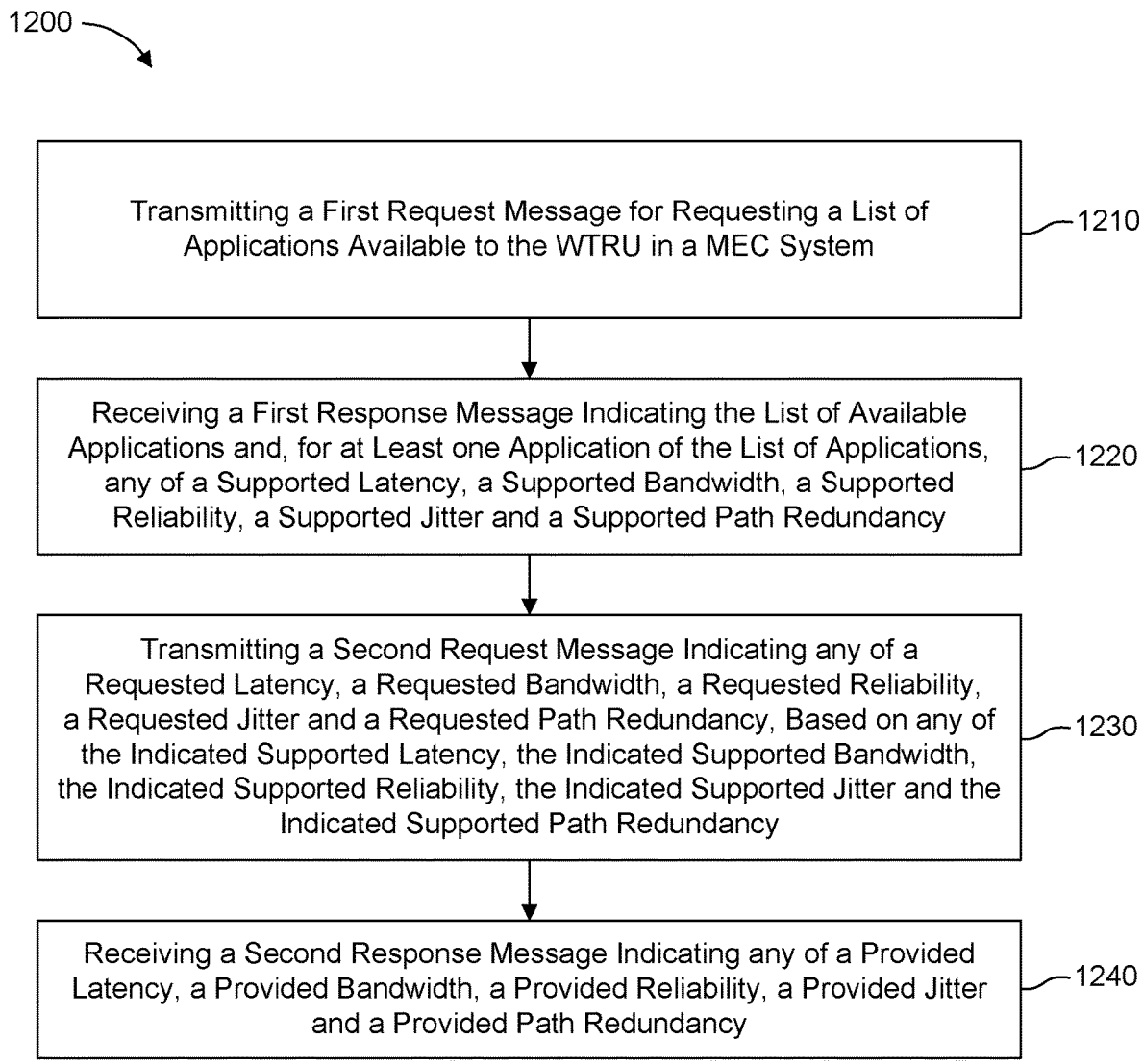
FIG. 12 is a diagram illustrating another example of a method for jointly selecting and configuring a MEC host and a RAW network.

FIG. 12 is a diagram illustrating another example of a method 1200 for jointly selecting and configuring a MEC host and a RAW network.

According to embodiments, in a step 1210, a WTRU may be configured to transmit (e.g., to a MEC system) a first request message for requesting a list of applications available to the WTRU in the MEC system.

According to embodiments, in a step 1220, the WTRU may be configured to receive (e.g., from the MEC system) a first response message indicating the list of available applications and, for at least one application of the list of applications, any of a supported latency, a supported bandwidth, a supported reliability, a supported jitter and a supported path redundancy.

According to embodiments, in a step 1230, the WTRU may be configured to transmit (e.g., to the MEC system) a second request message indicating any of a requested latency, a requested bandwidth, a requested reliability, a requested jitter and a requested path redundancy, based on any of the indicated supported latency, the indicated supported bandwidth, the indicated supported reliability, the indicated supported jitter and the indicated supported path redundancy.

According to embodiments, in a step 1240, the WTRU may be configured to receive (e.g., from the MEC system) a second response message indicating any of a provided latency, a provided bandwidth, a provided reliability, a provided jitter and a provided path redundancy (e.g., that may be provided to the at least one application by the MEC system).

For example, the first request message may comprise an indication that information indicating any of the supported latency, the supported bandwidth, the supported reliability, the supported jitter and the supported path redundancy may be requested.

For example, any of the indicated supported latency, the indicated supported bandwidth, the indicated supported reliability, the indicated supported jitter and the indicated supported path redundancy may indicate a presence of at least one reliable and available wireless, RAW, network segment between the WTRU and an MEC host associated with the at least one application.

For example, the second request message may indicate that an application context creation may be requested in the MEC system.

For example, the second request message may indicate an application context associated with the at least one application.

For example, the indicated application context may include any of the requested latency, the requested bandwidth, the requested reliability, the requested jitter and the requested path redundancy.

For example, the second response message may indicate the application context associated with the at least one application.

For example, the indicated application context may include any of the indicated provided latency, the indicated provided bandwidth, the indicated provided reliability, the indicated provided jitter and the indicated provided path redundancy.

For example, any of the indicated provided latency, the indicated provided bandwidth, the indicated provided reliability, the indicated provided jitter and the indicated provided path redundancy may respectively be equal to any of the requested latency, the requested bandwidth, the requested reliability, the requested jitter and the requested path redundancy.

For example, any of the indicated provided latency, the indicated provided bandwidth, the indicated provided reliability, the indicated provided jitter and the indicated provided path redundancy may be strictly lower than respectively any of the requested latency, the requested bandwidth, the requested reliability, the requested jitter and the requested path redundancy.

For example, the WTRU may be further configured to transmit a third request message indicating that an application context update may be requested in the MEC system.

For example, the third request message may indicate an updated application context associated with the at least one application.

For example, the indicated updated application context may include any of a new latency, a new bandwidth, a new reliability, a new jitter and a new path redundancy.

For example, the WTRU may be further configured to receive a third response message indicating that the application context may have been updated.

For example, the WTRU may be further configured to receive a notification message indicating, for the at least one application, a change of any of the indicated provided latency, the indicated provided bandwidth, the indicated provided reliability, the indicated provided jitter and the indicated provided path redundancy.

For example, the notification message may indicate any of an updated latency, an updated bandwidth, an updated reliability, an updated jitter and an updated path redundancy.

For example, the WTRU may be further configured to transmit a fourth response message indicating that the notification message may have been received.

While not explicitly described, the present embodiments may be employed in any combination or sub-combination. For example, the present principles are not limited to the described variants, and any arrangement of variants and embodiments can be used.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

What is claimed is:

1. A method implemented by a wireless transmit/receive unit, (WTRU), the method comprising:
   transmitting a first request message for requesting a list of applications available to the WTRU in a multi-access edge computing, (MEC), system, wherein the MEC system comprises a reliable and available wireless (RAW) network;
   receiving a first response message indicating the list of available applications and, for at least one application of the list of applications, one or more first reliability and availability parameters supported by the MEC system;
   transmitting a second request message indicating one or more second reliability and availability parameters based on the one or more first reliability and availability parameters, wherein the one or more second reliability and availability parameters are requested to be met by both the RAW network and a MEC host of the MEC system for the at least one application; and
   receiving a second response message indicating one or more third reliability and availability parameters provided over the RAW network between the WTRU and the MEC host.

2. The method of claim 1, wherein the second request message indicates that an application context creation is requested in the MEC system.

3. The method of claim 1, wherein the second request message indicates an application context associated with the at least one application.

4. The method of claim 1, wherein any of the indicated one or more third reliability and availability parameters are respectively equal to any of the one or more second reliability and availability parameters.

5. The method of claim 1, wherein any of the indicated one or more third reliability and availability parameters are strictly lower than respectively any of the one or more second reliability and availability parameters.

6. The method of claim 1, comprising transmitting a third request message indicating that an application context update is requested in the MEC system.

7. The method of claim 6, wherein the third request message indicates an updated application context associated with the at least one application.

8. The method of claim 1, comprising receiving a notification message indicating, for the at least one application, a change of any of the one or more third reliability and availability parameters.

9. The method of claim 8, comprising transmitting a fourth response message indicating that the notification message has been received.

10. The method of claim 1, wherein the one or more first reliability and availability parameters, the one or more second reliability and availability parameters, the one or more third reliability and availability parameters comprise any of a latency, a bandwidth, a reliability, a jitter and a path redundancy.

11. An apparatus comprising circuitry, including a transmitter, a receiver, a processor and a memory, configured to:
    transmit a first request message for requesting a list of applications available to the apparatus in a multi-access edge computing (MEC) system, wherein the MEC system comprises a reliable and available wireless (RAW) network;
    receive a first response message indicating the list of available applications and, for at least one application of the list of applications, one or more first reliability and availability parameters supported by the MEC system;
    transmit a second request message indicating one or more second reliability and availability parameters based on the one or more first reliability and availability parameters, wherein the one or more second reliability and availability parameters are requested to be met by both the RAW network and a MEC host of the MEC system for the at least one application; and
    receive a second response message indicating one or more third reliability and availability parameters provided over the RAW network between the apparatus and the MEC host.

12. The apparatus of claim 11, wherein the second request message indicates that an application context creation is requested in the MEC system.

13. The apparatus of claim 11, wherein any of the indicated one or more third reliability and availability parameters are respectively equal to any of the one or more second reliability and availability parameters.

14. The apparatus of claim 11, wherein any of the indicated one or more third reliability and availability parameters are strictly lower than respectively any of the one or more second reliability and availability parameters.

15. The apparatus of claim 11, wherein the apparatus is configured to transmit a third request message indicating that an application context update is requested in the MEC system.

16. The apparatus of claim 15, wherein the third request message indicates an updated application context associated with the at least one application.

17. The apparatus of claim 11, wherein the apparatus is configured to receive a notification message indicating, for the at least one application, a change of any of the one or more third reliability and availability parameters.

18. The apparatus of claim 17, wherein the apparatus is configured to transmit a fourth response message indicating that the notification message has been received.

19. The apparatus of claim 11, wherein the one or more first reliability and availability parameters, the one or more second reliability and availability parameters, the one or more third reliability and availability parameters comprise any of a latency, a bandwidth, a reliability, a jitter and a path redundancy.

20. The apparatus of claim 11, wherein the second request message indicates an application context associated with the at least one application.

* * * * *